US012697262B2

(12) United States Patent
Legros et al.

(10) Patent No.: US 12,697,262 B2
(45) Date of Patent: Aug. 4, 2026

(54) MANIFOLD ASSEMBLY

(71) Applicant: Hill-Rom Services, Inc., Batesville, IN (US)

(72) Inventors: Philippe Legros, Pluneret (FR); Pascal Lemonnier, Locoal Mendon (FR); Pierre-Yves Le Naour, Quimperle (FR); Mikael Maho, Pluvigner (FR); Anthony Thepaut, Pluneret (FR); Etienne Yvernault, Brech (FR)

(73) Assignee: Hill-Rom Services, Inc., Batesville, IN (US)

( * ) Notice: Subject to any disclaimer, the term of this patent is extended or adjusted under 35 U.S.C. 154(b) by 384 days.

(21) Appl. No.: 18/462,574

(22) Filed: Sep. 7, 2023

(65) Prior Publication Data

US 2024/0082086 A1 Mar. 14, 2024

Related U.S. Application Data

(60) Provisional application No. 63/405,066, filed on Sep. 9, 2022.

(51) Int. Cl.
*A61G 7/057* (2006.01)
*A47C 27/08* (2006.01)
*A47C 27/10* (2006.01)

(52) U.S. Cl.
CPC ..... *A61G 7/05776* (2013.01); *A61G 7/05707* (2013.01); *A47C 27/08* (2013.01);
(Continued)

(58) Field of Classification Search
CPC ..... A47C 27/082; A47C 27/08; A47C 27/081; A47C 27/083; A47C 27/10;
(Continued)

(56) References Cited

U.S. PATENT DOCUMENTS 2,345,073 A 3/1944 Rosett
3,462,778 A 8/1969 Whitney
(Continued)

FOREIGN PATENT DOCUMENTS

AU 2006214230 B2 10/2009
AU 2020244416 B1 5/2021
(Continued)

*Primary Examiner* — Justin C Mikowski
*Assistant Examiner* — Deborah Talitha Gedeon
(74) *Attorney, Agent, or Firm* — Price Heneveld LLP

(57) ABSTRACT

A manifold assembly includes a manifold core defining an inlet tube, an outlet tube, a first projection configured to be fluidly coupled with a first bladder, and a second projection configured to be fluidly coupled with a second bladder. A connector is operably coupled to the manifold core and defines a first pathway region, a second pathway region, and release notches. A motor rotates the connector to a first position to fluidly couple the outlet tube with the first projection via the first pathway region and the inlet tube with the second projection via the second pathway region, to a second position to fluidly couple the first and projections with the release notches, and to a third position to fluidly couple the outlet tube with the second projection via the first pathway region and the inlet tube with the first projection via the second pathway region.

20 Claims, 21 Drawing Sheets

(52) U.S. Cl.
CPC .......... *A47C 27/081* (2013.01); *A47C 27/082* (2013.01); *A47C 27/083* (2013.01); *A47C 27/10* (2013.01)

(58) Field of Classification Search
CPC ............ A61G 7/05769; A61G 7/05776; A61G 7/05784; A61H 2201/0103; A61H 2201/0146; A61M 16/0066; F04B 49/22; F04B 33/00; F04B 49/007; F04D 29/462
USPC ............................ 137/625.21, 625.46; 5/713
See application file for complete search history.

(56) References Cited

U.S. PATENT DOCUMENTS

| | | | | |
|---|---|---|---|---|
| 3,875,967 | A | 4/1975 | deFries | |
| 4,197,837 | A | 4/1980 | Tringali et al. | |
| 4,364,370 | A | 12/1982 | Smith et al. | |
| 4,825,486 | A | 5/1989 | Kimura et al. | |
| 5,109,561 | A | 5/1992 | Schild | |
| 5,117,518 | A | 6/1992 | Schild | |
| 5,152,319 | A | 10/1992 | Hannagan | |
| 5,233,974 | A | 8/1993 | Senoue et al. | |
| 5,362,214 | A * | 11/1994 | Neward | F04B 33/00 251/243 |
| 5,375,273 | A | 12/1994 | Bodine, Jr. et al. | |
| 6,058,538 | A | 5/2000 | Chapman et al. | |
| 6,148,461 | A | 11/2000 | Cook et al. | |
| 6,282,737 | B1 | 9/2001 | Vrzalik | |
| 6,324,845 | B1 | 12/2001 | Fulks et al. | |
| 6,349,439 | B1 | 2/2002 | Cook et al. | |
| 6,711,771 | B2 | 3/2004 | Cook et al. | |
| 6,721,979 | B1 | 4/2004 | Vrzalik et al. | |
| 6,745,996 | B1 | 6/2004 | Guthrie | |
| 6,789,284 | B2 | 9/2004 | Kemp | |
| 6,877,178 | B2 | 4/2005 | Chapman et al. | |
| 6,928,681 | B1 | 8/2005 | Stacy | |
| 7,219,380 | B2 | 5/2007 | Beck | |
| 7,444,704 | B2 | 11/2008 | Phillips et al. | |
| 7,784,132 | B2 | 8/2010 | Gonzalez et al. | |
| 8,006,333 | B2 * | 8/2011 | Genaro | A61G 7/05776 5/710 |
| 9,801,767 | B2 | 10/2017 | Gowda et al. | |
| 9,890,548 | B2 | 2/2018 | Malinasky, Jr. | |
| 10,034,808 | B2 | 7/2018 | Vrzalik et al. | |
| 10,856,668 | B2 | 12/2020 | Ye et al. | |
| 10,959,536 | B2 | 3/2021 | Ye et al. | |
| 2002/0121307 | A1 | 9/2002 | Stacy | |
| 2006/0167389 | A1 | 7/2006 | Evans et al. | |
| 2006/0236464 | A1 | 10/2006 | Beck et al. | |
| 2009/0217460 | A1 | 9/2009 | Bobey et al. | |
| 2014/0259432 | A1 | 9/2014 | Gowda et al. | |
| 2018/0289174 | A1 * | 10/2018 | Ye | A47C 21/006 |
| 2019/0021925 | A1 | 1/2019 | Jiang et al. | |
| 2019/0110607 | A1 | 4/2019 | Ye et al. | |
| 2019/0151175 | A1 | 5/2019 | Kelch et al. | |
| 2019/0358115 | A1 | 11/2019 | Waldridge | |
| 2020/0229610 | A1 * | 7/2020 | Wu | A47C 27/082 |
| 2021/0259899 | A1 | 8/2021 | Maho et al. | |
| 2023/0000703 | A1 | 1/2023 | Legros et al. | |

FOREIGN PATENT DOCUMENTS

| | | | | |
|---|---|---|---|---|
| CN | 2771586 | Y | * | 4/2006 |
| CN | 204193300 | U | | 3/2015 |
| CN | 209790251 | U | | 12/2019 |
| CN | 210785103 | U | | 6/2020 |
| CN | 211202967 | U | | 8/2020 |
| CN | 211300811 | U | * | 8/2020 |
| CN | 111779860 | B | | 4/2021 |
| CN | 215596494 | U | | 1/2022 |
| EP | 3107514 | B1 | | 9/2020 |
| EP | 3868348 | A1 | | 8/2021 |
| FR | 1291237 | A | | 4/1962 |
| FR | 2990479 | A1 | | 11/2013 |
| GB | 2344153 | B | | 5/2000 |
| JP | 55084827 | A | | 6/1980 |
| JP | S59166769 | A | | 9/1984 |
| JP | H06237844 | A | | 8/1994 |
| KR | 19980034263 | U | | 9/1998 |
| SE | 452209 | B | | 11/1987 |
| TW | M316333 | U | | 8/2007 |
| TW | M351966 | U | | 3/2009 |
| WO | 2016018914 | A2 | | 2/2016 |
| WO | 2020174418 | A1 | | 9/2020 |
| WO | 2023277759 | A1 | | 6/2021 |
| WO | 2023277760 | A1 | | 6/2021 |

* cited by examiner

MANIFOLD ASSEMBLY

CROSS-REFERENCE TO RELATED APPLICATION

This application claims priority to and the benefit under 35 U.S.C. § 119(e) of U.S. Provisional Application No. 63/405,066, filed on Sep. 9, 2022, entitled "MANIFOLD ASSEMBLY," the disclosure of which is hereby incorporated herein by reference in its entirety.

FIELD OF THE DISCLOSURE

The present disclosure generally relates to a manifold assembly, and more particularly to a manifold assembly for providing patient therapy.

SUMMARY OF THE DISCLOSURE

According to one aspect of the present disclosure, a manifold assembly includes a manifold core defining an inlet tube that defines a portion of a positive pressure path, an outlet tube that defines a portion of a negative pressure path, a first projection configured to be fluidly coupled with a first bladder, and a second projection configured to be fluidly coupled with a second bladder. A connector is operably coupled to the manifold core. The connector defines a first pathway region, a second pathway region, and first and second release notches. A motor is operably coupled to the connector to rotate the connector relative to the manifold core. The motor is configured to rotate the connector to a first position to fluidly couple the outlet tube with the first projection via the first pathway region and the inlet tube with the second projection via the second pathway region, rotate the connector to a second position to fluidly couple the first projection with the first release notch and the second projection with the second release notch, and rotate the connector to a third position to fluidly couple the outlet tube with the second projection via the first pathway region and the inlet tube with the first projection via the second pathway region.

According to another aspect of the present disclosure, a surface assembly includes a covering defining an interior. First bladders are disposed within the interior. Second bladders disposed within the interior. Each of the first and second bladders is operable between an expanded condition, a neutral condition, and a compressed condition. A pump has an inlet port and an outlet port. The pump is configured to provide positive pressure through the outlet port and negative pressure through the inlet port. A manifold assembly is in fluid communication with the pump and each of the first and second bladders. The manifold assembly includes a manifold core having an inlet tube in fluid communication with the outlet port and an outlet tube in fluid communication with the inlet port. The manifold core has a first projection in fluid communication with the first bladders and a second projection in fluid communication with the second bladders. A connector is operably coupled to the manifold core. The connector defines first and second pathway regions and release notches. A motor is operably coupled to the connector. The motor is configured to rotate the connector relative to the manifold core to fluidly couple the first bladders to the inlet port and the second bladders to the outlet port in a first operating state and the first bladders to the outlet port and the second bladders to the inlet port in a second operating state.

According to another aspect of the present disclosure, a pneumatic system includes first bladders and second bladders arranged in an alternating pattern. A pump is configured to provide positive pressure and negative pressure. A manifold assembly is fluidly coupled to the first and second bladders and the pump. The manifold assembly includes a manifold core having an engagement surface defining apertures in fluid communication with an inlet tube, an outlet tube, a first projection, and a second projection, respectively. A connector defines a first pathway region, a second pathway region, and release notches. A motor is configured to rotate the connector relative to the manifold core. A controller is communicatively coupled with the pump and the motor. The controller is configured to activate the motor to rotate the connector to fluidly couple the inlet tube with the first projection and the outlet tube with the second projection in at least one operating state and activate the motor to rotate the connector to align the release notches with the apertures in fluid communication with the first and second projections in a release state.

These and other features, advantages, and objects of the present disclosure will be further understood and appreciated by those skilled in the art by reference to the following specification, claims, and appended drawings.

DETAILED DESCRIPTION

Figure 1:
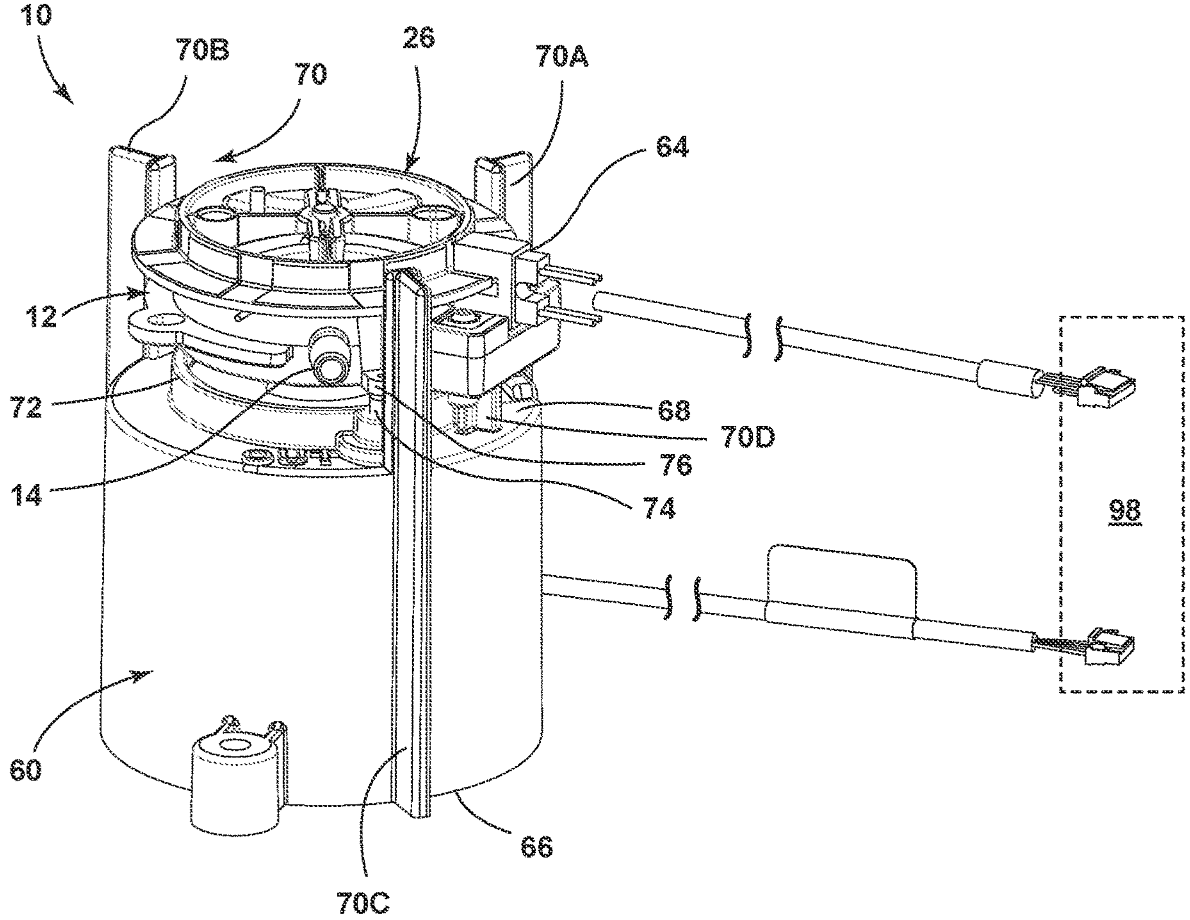
FIG. 1 is a side perspective view of a manifold assembly, according to the present disclosure.

The present illustrated embodiments reside primarily in combinations of method steps and apparatus components related to a manifold assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-36, reference numeral 10 generally designates a manifold assembly 10 that includes a manifold core 12 having an inlet tube 14 configured to define a portion of a positive pressure path, an outlet tube 16 configured to define a portion of a negative pressure path, a first projection 18 configured to be fluidly coupled with first bladders 20, and a second projection 22 configured to be fluidly coupled with second bladders 24. A connector 26 is operably coupled to the manifold core 12. The connector 26 defines a first pathway region 28, a second pathway region 30, and first and second release notches 32, 34. A motor 36 is operably coupled to the connector 26 through the manifold core 12 to rotate the connector 26 relative to the manifold core 12. The motor 36 is configured to rotate the connector 26 to a first position 38 to fluidly couple the outlet tube 16 with the first projection 18 via the first pathway region 28 and the inlet tube 14 with the second projection 22 via the second pathway region 30. The motor 36 is also configured to rotate the connector 26 in a first direction to a second position 40 to fluidly couple the first projection 18 with the first release notch 32 and the second projection 22 with the second release notch 34. The motor 36 is further configured to rotate the connector 26 in the first direction to a third position 42 to fluidly couple the outlet tube 16 with the second projection 22 via the first pathway region 28 and the inlet tube 14 with the first projection 18 via the second pathway region 30.

Figure 2:
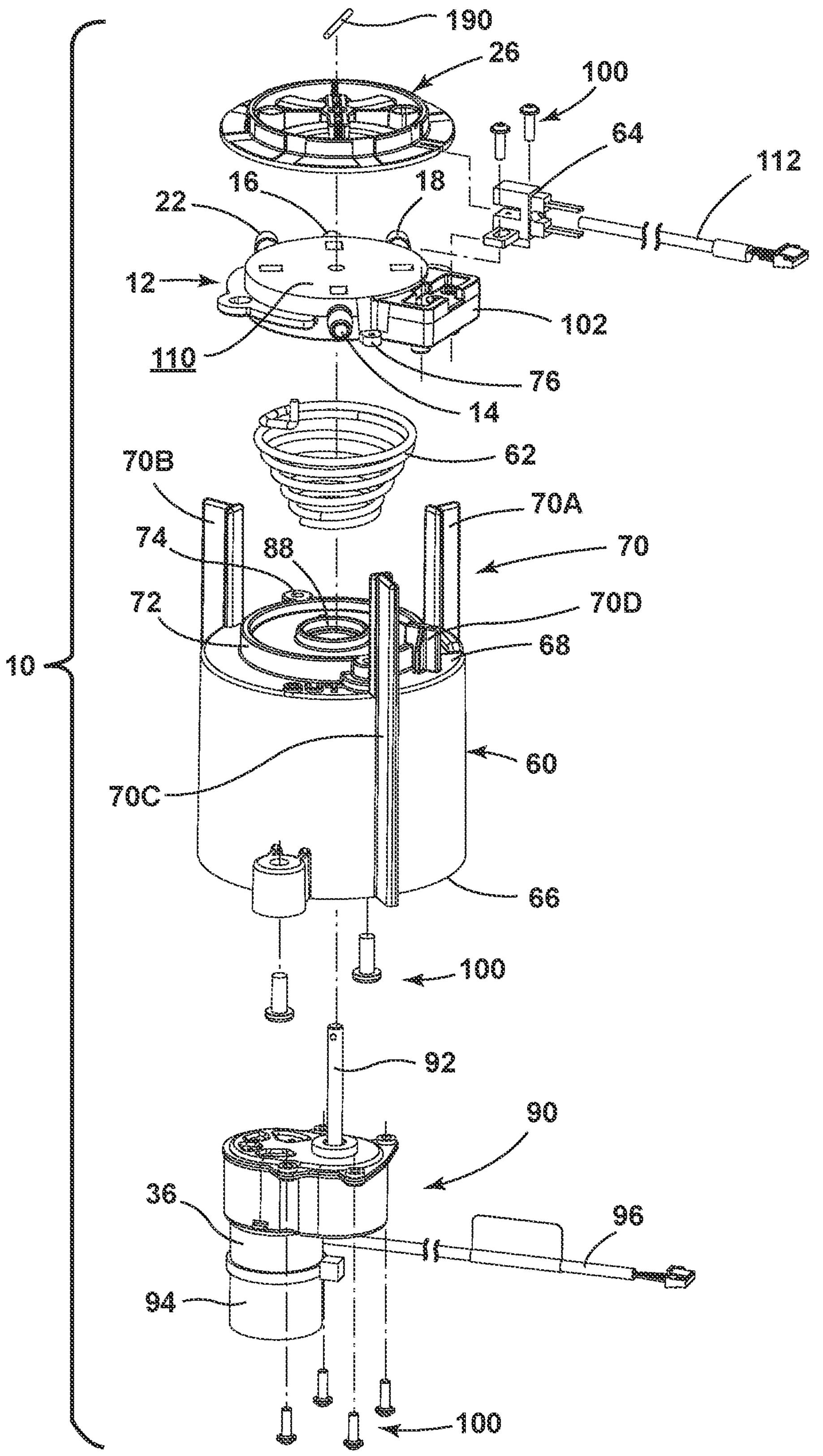
FIG. 2 is a side perspective exploded view of a manifold assembly, according to the present disclosure.

Referring to FIGS. 1 and 2, the manifold assembly 10 is configured to guide and direct fluid based on the position of the connector 26 relative to the manifold core 12. The manifold assembly 10 includes a housing 60 for housing the motor 36, the manifold core 12 coupled to the housing 60, the connector 26 operably coupled to the manifold core 12 and driven by the motor 36, a biasing member 62 to bias the manifold core 12 toward the connector 26, and an optical switch 64 to sense a position of the connector 26.

Figure 3:
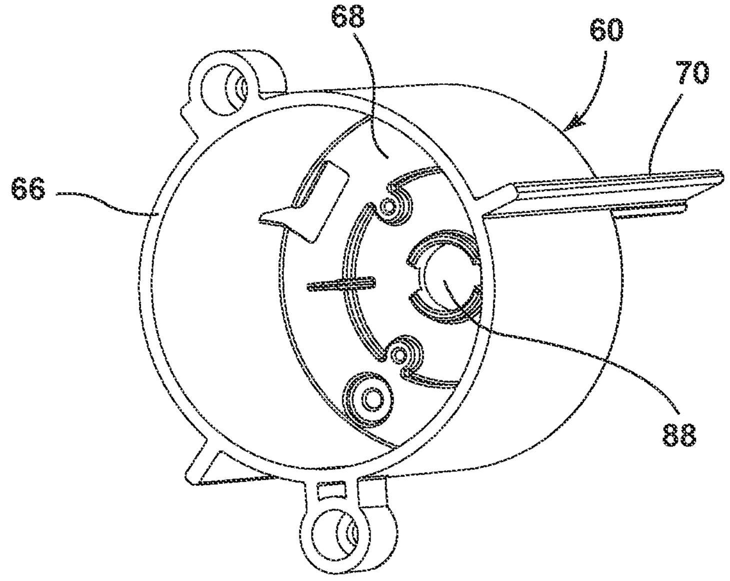
FIG. 3 is a side perspective view of a housing for a motor of a manifold assembly, according to the present disclosure.

Referring still to FIGS. 1 and 2, as well as FIG. 3, the housing 60 is a generally cylindrical shape with an open end 66 to receive the motor 36. An opposing end of the housing 60 is a support end 68, which is configured to support components of the manifold assembly 10 and which is a substantially closed end of the housing 60. The housing 60 includes supports 70, including supports 70A-70D, that extend from the open end 66 to extend beyond the support end 68. The supports 70 provide increased strength for the manifold assembly 10, as well as assist with positioning of the manifold core 12 and the connector 26. The supports 70A-70C define a space for receiving and holding the manifold core 12 and the connector 26.

The supports 70A, 70B, 70C generally extend a same length from the housing 60 and extend beyond the connector 26 when the manifold assembly 10 is assembled. The support 70D extends a shorter length from the housing 60 compared to the supports 70A-70C. Generally, the support 70D assists with positioning and aligning the manifold core 12 as described herein.

The support end 68 of the housing 60 includes a protruding region 72 that is configured to engage the biasing member 62. The housing 60 also includes protrusions 74 outside of the protruding region 72 and on the support end 68. The protrusions 74 are configured to engage tabs 76 of the manifold core 12.

The support end 68 of the housing 60 defines a central opening 88, and a driveshaft 92 operably coupled with the motor 36 is configured to extend through the central opening 88. A motor assembly 90 includes the motor 36, a gearbox 94, the driveshaft 92, and an electrical connector 96 configured to engage a control assembly 98. The motor 36 and the gearbox 94 are disposed within the housing 60, while the driveshaft 92 and the electrical connector 96 extend through or out of the housing 60. The motor 36 is coupled to the housing 60 via fasteners 100.

Figure 4:
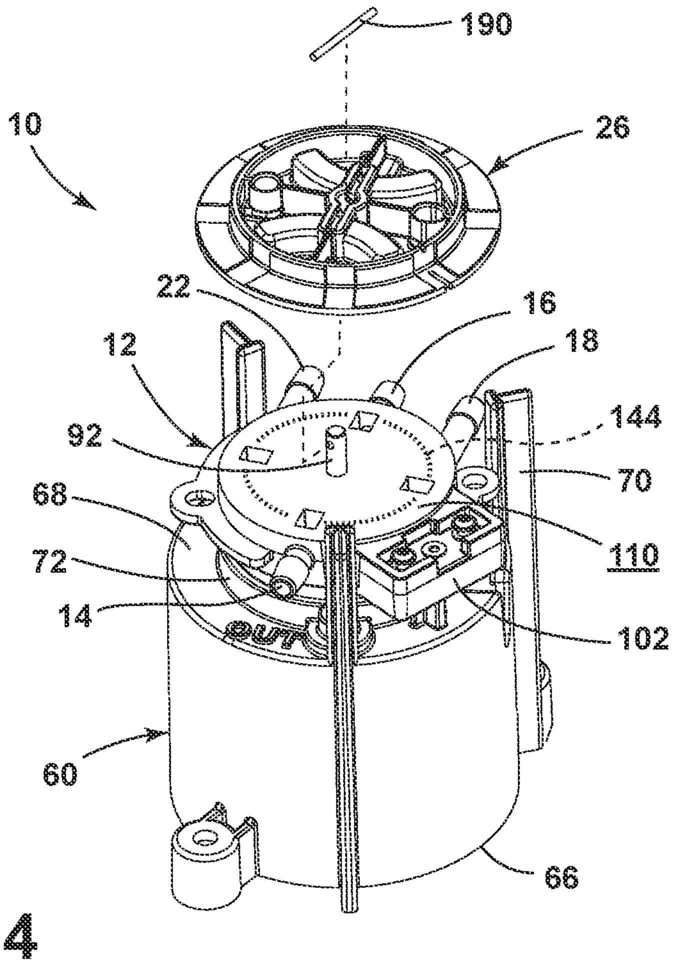
FIG. 4 is a side perspective partially exploded view of a manifold assembly, according to the present disclosure.

Referring again to FIGS. 1 and 2, as well as FIG. 4, the driveshaft 92 extends through the central opening 88, through the biasing member 62, through the manifold core 12, and through the connector 26. The motor 36 drives rotation of the driveshaft 92, which, consequently, drives rotation of the connector 26 as described herein. In various examples, the motor 36 is configured as a stepper motor 36, which is configured to rotate the connector 26 to specific positions.

The motor 36 may pilot the function of the manifold assembly 10 by rotating the connector 26. The motor 36 is generally configured to drive rotation of the connector 26 in a single direction but may rotate clockwise and counter-clockwise without departing from the teachings herein.

The manifold assembly 10 also includes the biasing member 62, which biases the manifold core 12 toward the connector 26 to maintain an engagement between the manifold core 12 and the connector 26. In the illustrated example of FIG. 2, the biasing member 62 is configured as a coil spring 62. The spring 62 has a conical shape with a width increasing as the spring 62 extends away from the housing 60. In this way, the spring 62 has a smaller width proximate to the housing 60 than the width proximate to the manifold core 12. The conical shape of the spring 62 allows for greater compression of the spring 62 to minimize the space between the housing 60 and the manifold core 12 and provide a more compact manifold assembly 10.

In various aspects, the spring 62 is coupled to the support end 68 of the housing 60, extends through the manifold core 12, and engages the connector 26. The spring 62 extending through the manifold core 12 may be advantageous for properly aligning the manifold core 12 relative to the housing 60 and maintaining this alignment. Further, the engagement between the connector 26 and the biasing member 62 may not substantially impede the rotation of the connector 26 relative to the manifold core 12. For example, the connector 26 may define an internal channel through which the biasing member 62 extends, allowing rotation of the connector 26 relative to the biasing member 62 while providing a biasing force to the connector 26.

Referring still to FIGS. 1 and 2, the manifold assembly 10 also includes the optical switch 64 coupled to an extension 102 of the manifold core 12 via fasteners 100. The extension 102 is positioned on and supported by the support 70D. Accordingly, the support 70D assists with positioning the manifold core 12 relative to the housing 60. The optical switch 64 is disposed proximate to an engagement surface 110 of the manifold core 12, which is configured to abut and engage the connector 26. The optical switch 64 has an electrical connector 112 for coupling the optical switch 64 with the control assembly 98. The optical switch 64 is configured to sense a position of the connector 26 and communicate the position to the control assembly 98.

Figure 5:
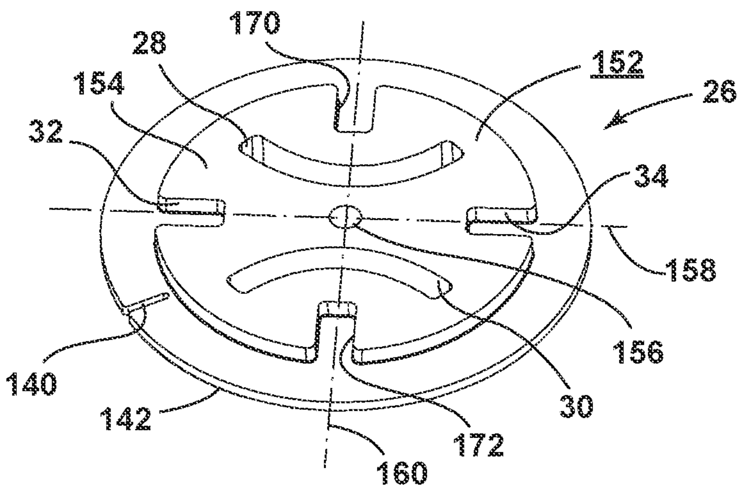
FIG. 5 is a bottom perspective view of a connector of a manifold assembly, according to the present disclosure.

Referring still to FIGS. 1 and 2, as well as FIG. 5, the motor 36 is configured to adjust the connector 26 to certain predefined positions 38-42, 120-128 (FIGS. 12-25), and the optical switch 64 may confirm or verify the position of the connector 26. The connector 26 includes a reference notch 140 defined in an outer rim 142 of the connector 26. The optical switch 64 is configured to sense the position of the reference notch 140. The optical switch 64 may be advantageous for verifying the position of the connector 26, as well as maintaining accuracy in the position of the connector 26. Maintaining accuracy in the positioning of the connector 26 may maximize efficiency of fluid (i.e., airflow) through the manifold core 12. Additionally, the reference notch 140 and the optical switch 64 are configured to provide the zero reference point for the connector 26 to be adjusted to the various predefined positions 38-42, 120-128.

Figure 6:
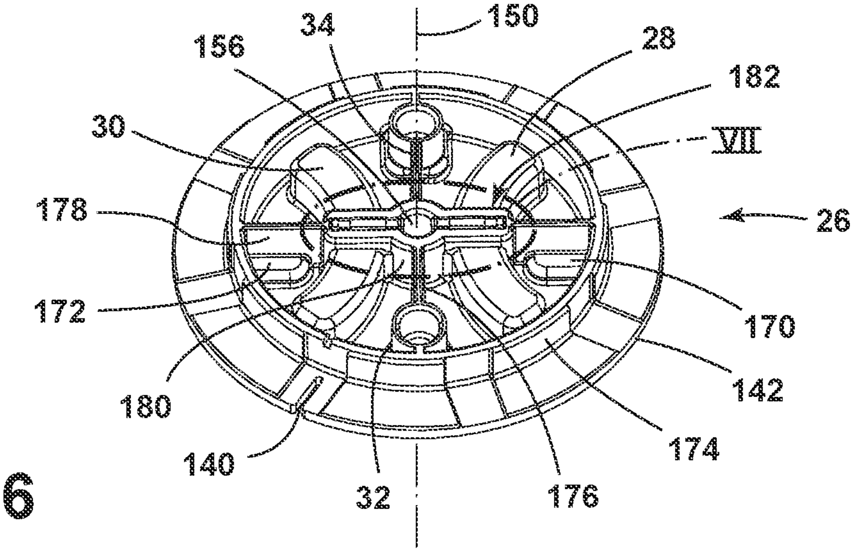
FIG. 6 is a top perspective view of a connector for a manifold assembly, according to the present disclosure.
Figure 7:
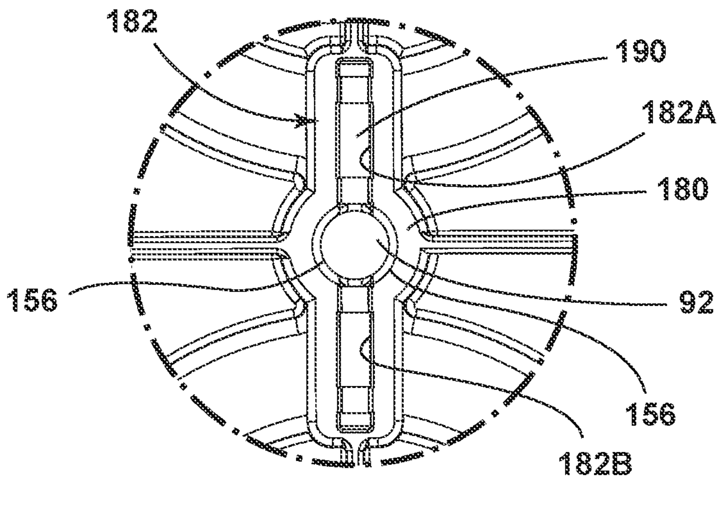
FIG. 7 is an enlarged top plan view of the connector of FIG. 6, taken at area VII, showing a retaining pin engaged with an end of a driveshaft, according to the present disclosure.

Referring again to FIG. 4, as well as FIGS. 5-7, the connector 26 is rotatably coupled to the manifold core 12. Generally, the engagement between the manifold core 12 and the connector 26 is an airtight engagement, which may be accomplished by using a sealant 144 along with the biasing force of the biasing member 62. The sealant 144 is generally grease disposed between two coupled components, such as the manifold core 12 and the connector 26. The grease provides the airtight engagement while reducing the number of components in the manifold assembly 10, which may be advantageous for increasing the longevity of the manifold assembly 10 and providing a more compact manifold assembly 10. The grease also provides for the sliding engagement between the manifold core 12 and the connector 26 while maintaining the airtight seal.

The connector 26 is configured to rotate about a rotational axis 150, which is substantially normal to a direction of fluid through the manifold core 12. The position of the connector 26 determines flow paths of the fluid through the manifold core 12. The connector 26 may be a cover, a plate, a cap, a valve, a channeling valve, a disk, a valve disk, or any other feature that is configured to be rotated by the motor 36 and direct the fluid through the manifold assembly 10.

The connector 26 generally has a circular shape, which substantially mirrors the shape of the manifold core 12 and can rotate within the space defined by the supports 70 of the housing 60. An inner side of the connector 26 includes an abutting surface 152 of the connector 26 is configured to engage the manifold core 12. The abutting surface 152 is configured to slidably engage the engagement surface 110 of the manifold core 12 as the connector 26 is rotated by the motor 36.

The inner side of the connector 26 includes a central portion 154 that is offset from the outer rim 142. Generally, the central portion 154 protrudes relative to the outer rim 142. The connector 26 defines a central aperture 156 within the central portion 154 through which the driveshaft 92 extends. The central portion 154 defines the first and second pathway regions 28, 30, which are generally defined as arcuate or parabolic regions. The first and second pathway regions 28, 30 are generally recessed regions relative to the abutting surface 152 and configured to form channels with the engagement surface 110 when the connector 26 is abutting the manifold core 12. The pathway regions 28, 30 are generally mirror images of one another over a first central axis 158. One pathway region 28, 30 is defined on each side of the first central axis 158. Further, each pathway region 28, 30 is symmetrical over a second central axis 160, which is generally normal to the first central axis 158.

Referring still to FIGS. 5-7, the connector 26 also defines the first and second release notches 32, 34, as well as third and fourth release notches 170, 172. The release notches 32, 34, 170, 172 are defined along a perimeter of the central portion 154. The release notches 32, 34, 170, 172 are recessed areas relative to the abutting surface 152 to a surface of the outer rim 142. The release notches 32, 34, 170, 172 have a depth less than a depth of the pathway regions 28, 30 relative to the abutting surface 152. Surfaces in the recessed release notches 32, 34, 170, 172 are generally co-planar with a surface of the outer rim 142.

The release notches 32, 34, 170, 172 are generally defined about 90° from one another along the perimeter of the central portion 154. Using the central axes 158, 160, the release notches 32, 34, 170, 172 are each defined on one of the central axes 158, 160. Accordingly, the first and second release notches 32, 34 are disposed diametrically opposed from one another and along the first central axis 158. The third and fourth release notches 170, 172 are disposed diametrically opposed from one another and along the second central axis 160.

The pathway regions 28, 30 extend between adjacent release notches 32, 34, 170, 172. For example, the first pathway region 28 extends from between the first and third release notches 32, 170, around the third release notch 170, and to between the second and third release notches 34, 170. The second pathway region 30 extends from between the first and fourth release notches 32, 172, around the fourth release notch 172, and between the second and fourth release notches 34, 172. The configuration of the release notches 32, 34, 170, 172 and the pathway regions 28, 30 allows the connector 26 to rotate to the different predefined positions 38-42, 120-128 and adjust the airflow through the manifold core 12. Generally, the reference notch 140, which provides the zero reference point, is defined between the first and fourth release notches 32, 172 proximate to an end of the second pathway region 30.

An outer side of the connector 26 includes protruding areas that correspond to the release notches 32, 34, 170, 172 and the pathway regions 28, 30. These protruding areas are defined within a raised border 174, which generally aligns with the central portion 154. The connector 26 includes two raised supports 176, 178 extending within the raised border 174. The first raised support 176 extends along the first central axis 158 between protruding areas that correspond to the first and second release notches 32, 34. The second raised support 178 extends along the second central axis 160 between the protruding areas that correspond to the third and fourth release notches 170, 172.

The first and second raised supports 176, 178 are each coupled with a guide 180, which forms a raised wall about the central aperture 156. The guide 180 also extends along the second central axis 160. The guide 180 extends to or beyond the protruding areas that correspond with the pathway regions 28, 30 to form an elongated thickened area. The guide 180 defines grooves 182 extending along the second central axis 160 on both sides of the central aperture 156. The grooves 182 include a groove 182A on an opposing side of the central aperture 156 relative to a groove 182B.

Referring again to FIG. 4 and still to FIGS. 6 and 7, the manifold assembly 10 includes a retaining pin 190, which retains the connector 26 in the engagement with the manifold core 12. The retaining pin 190 is configured to be disposed within the grooves 182 defined by the guide 180 on the connector 26. The retaining pin 190 is configured to extend through the driveshaft 92 and be seated in the grooves 182 to couple the driveshaft 92 and, consequently, the motor 36 to the connector 26. Accordingly, the motor 36 drives rotation of the driveshaft 92, and the retaining pin 190 causes rotation to be transferred from the driveshaft 92 to the connector 26. Additionally, the biasing force from the biasing member 62 assists in maintaining the retaining pin 190 within the grooves 182. The biasing force biases the manifold core 12 toward the connector 26 and, consequently, biases the connector 26 toward the retaining pin 190.

Figure 8:
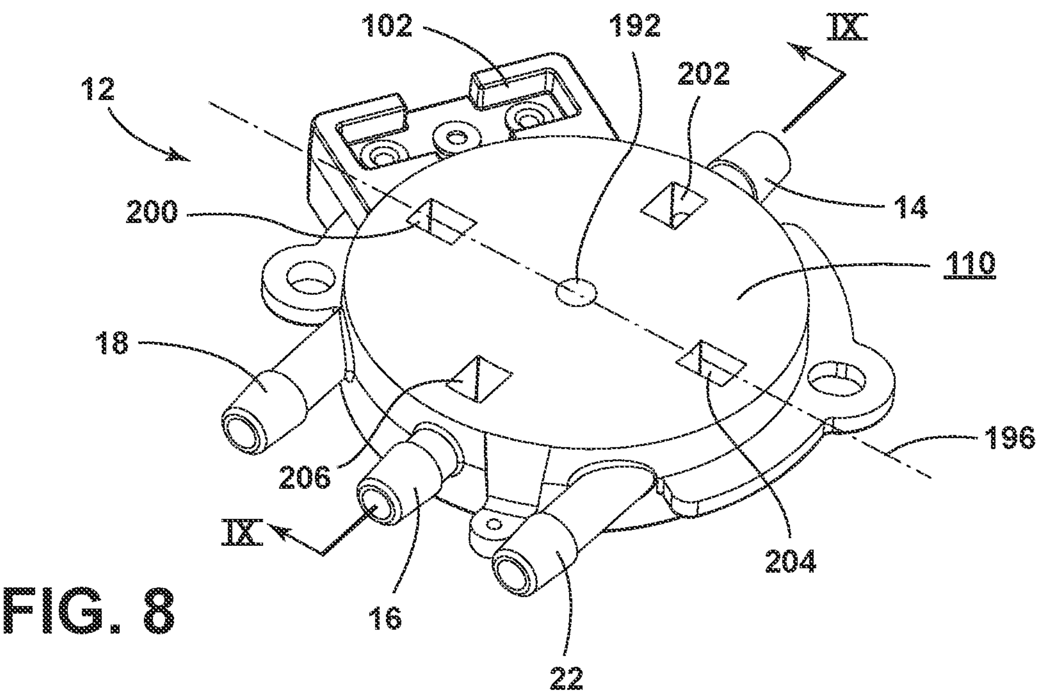
FIG. 8 is a side perspective view of a manifold core for a manifold assembly, according to the present disclosure.
Figure 9:
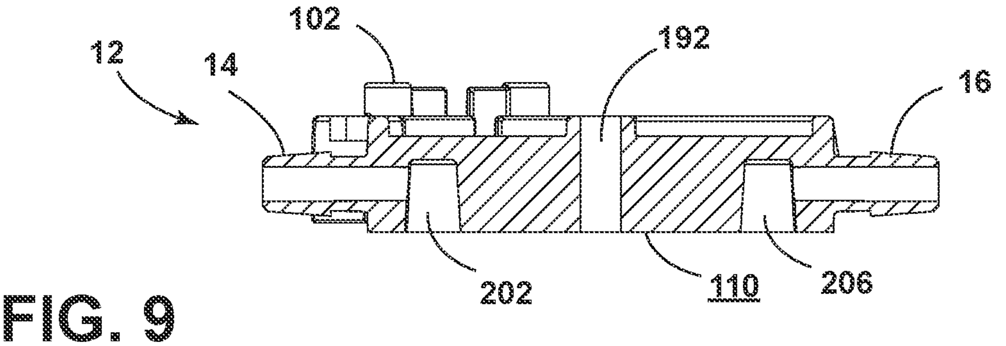
FIG. 9 is a cross-sectional view of the manifold core of FIG. 8, taken at line IX-IX, according to the present disclosure.
Figure 10:
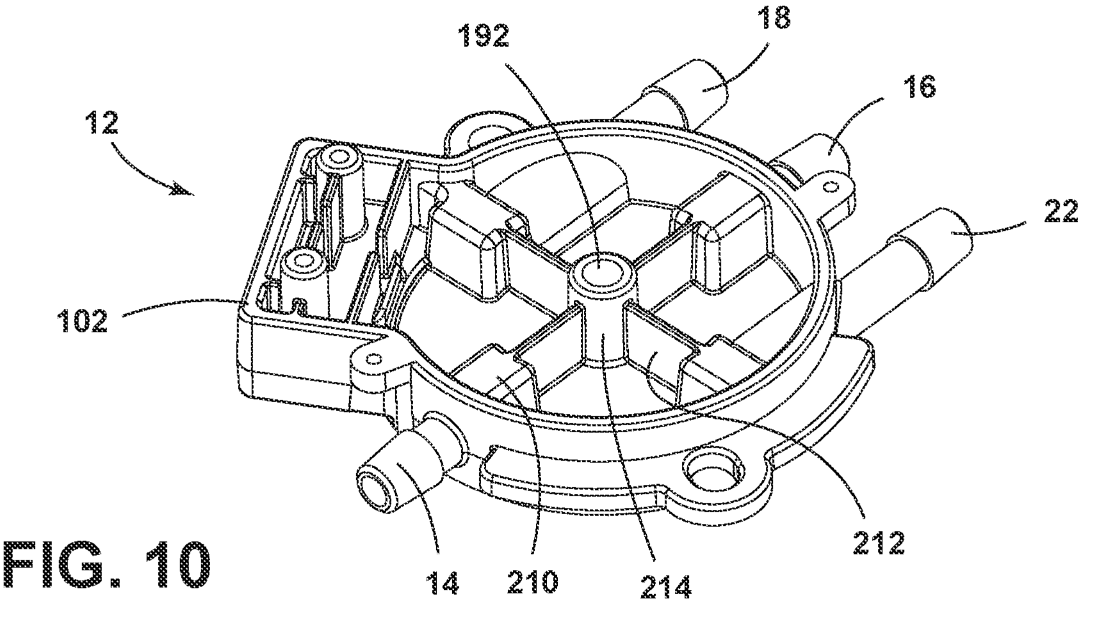
FIG. 10 is a side perspective view of a manifold core for a manifold assembly, according to the present disclosure.
Figure 11:
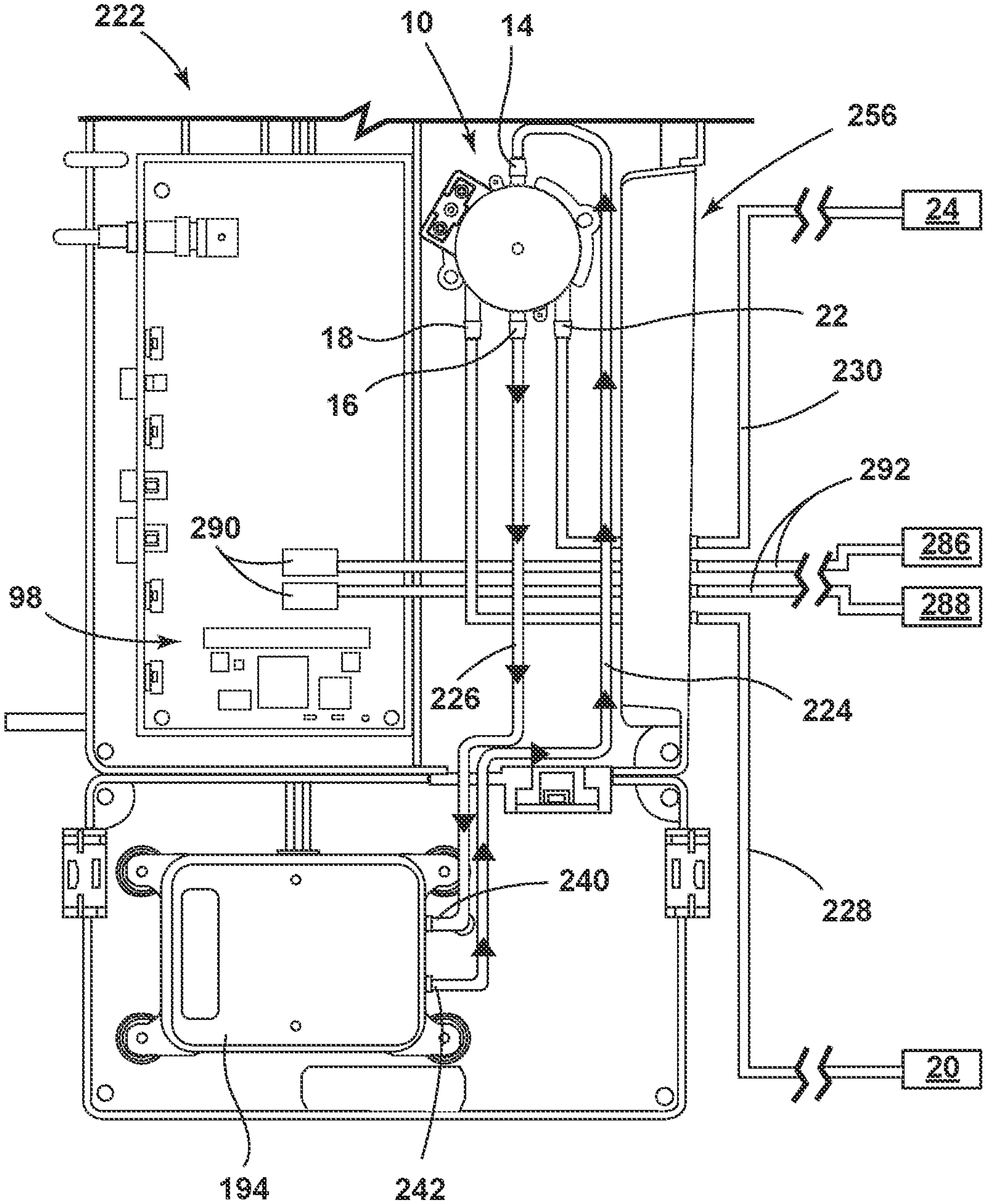
FIG. 11 is a top perspective view of a pneumatic enclosure for a pneumatic system, including a pump and a manifold assembly, according to the present disclosure.

Referring to FIGS. 8-10, the manifold core 12 guides the fluid, which is generally air, based on the position of the connector 26 (see FIGS. 12-25). The manifold core 12 defines a central aperture 192 configured to receive the driveshaft 92. The manifold core 12 includes the inlet tube 14, the outlet tube 16, and the first and second projections 18, 22. The inlet and outlet tubes 14, 16 are configured to be in fluid communication with a pump 194 (FIG. 11), and the first and second projections 18, 22 are configured to be in fluid communication with the first and second bladders 20, 24, respectively. Accordingly, the manifold assembly 10 is configured to direct the airflow between the pump 194 and the first and second bladders 20, 24.

The outlet tube 16 and the first and second projections 18, 22 are disposed on one side of a center axis 196 of the manifold core 12, extending a first direction from the manifold core 12, while the inlet tube 14 is on an opposing side, extending in a second opposing direction from the manifold core 12. Generally, the inlet and outlet tubes 14, 16 are disposed diametrically opposed from one another. The outlet tube 16 and the first and second projections 18, 22 are configured in a linear arrangement along the side of the manifold core 12. Each of the projections 18, 22 and the tubes 14, 16 extend to a similar distance from the manifold core 12.

The engagement surface 110 of the manifold core 12 defines four apertures 200-206 that are in fluid communication with the tubes 14, 16 and the projections 18, 22, respectively. In this way, the first aperture 200 is in fluid communication with the first projection 18, the second aperture 202 is in fluid communication with the inlet tube 14, the third aperture 204 is in fluid communication with the second projection 22, and the fourth aperture 206 is in fluid communication with the outlet tube 16. As illustrated in FIG. 9, the apertures 200-206 extend into the manifold core 12 to engage airflow channels of the tubes 14, 16 and the projections 18, 22, respectively, providing airflow channels through the manifold core 12. The airflow channels may not be in fluid communication with one another through the manifold core 12 but via space between the connector 26 and the manifold core 12 as described herein.

The apertures 200-206 are generally defined about 90° from one another about the manifold core 12. The first and third apertures 200, 204 are diametrically opposed to one another, and the second and fourth apertures 202, 206 are diametrically opposed to one another. The first and third apertures 200, 204 are positioned on the center axis 196.

As illustrated in FIG. 10, an inner side of the manifold core 12, which is oriented toward the housing 60 (FIG. 1), is substantially hollow. The inner side includes protruding portions 210 that define the airflow channels and support structures 212 that extend from each of the protruding portions 210 to a center guide 214 for the driveshaft 92. The substantially hollow manifold core 12 may provide for a more efficient manufacturing process. Further, the substantially hollow manifold core 12 may reduce a weight of the manifold assembly 10, which may be advantageous for reducing the weight of a surface assembly 220 (FIG. 26) with the manifold assembly 10 that may be carried or adjusted by a caregiver.

Referring to FIGS. 11-25, the manifold assembly 10 is included in a pneumatic system 222, which also includes the pump 194, the control assembly 98, and the first and second bladders 20, 24. Tubing 224, 226 extends between the pump 194 and the manifold assembly 10, and additional tubing 228, 230 extends between the manifold assembly 10 and the first and second bladders 20, 24, respectively. The pump 194 is configured to direct the air through the manifold assembly 10. The pump 194 is configured to simultaneously provide positive pressure, directing air into one of the first and second bladders 20, 24, and negative pressure, vacuum air from the other of the first and second bladders 20, 24.

The pump 194 includes an inlet port 240, which is configured to vacuum air into the pump 194 and provide the negative pressure or vacuum, and an outlet port 242, which is configured to drive air into the bladders 20, 24 and provide the positive pressure. The pump 194 is configured to simultaneously drive fluid through the manifold assembly 10 to one set of the bladders 20, 24 and vacuum fluid from the other set of the bladders 20, 24 through the manifold assembly 10.

The outlet port 242 of the pump 194 is coupled to the inlet tube 14 of the manifold core 12 via the tubing 224. The positive pressure path is then defined from the pump 194, through the tubing 224, through the manifold assembly 10 via the inlet tube 14, through one of the tubing 228, 230, and into one of the first and second bladders 20, 24. The inlet port 240 of the pump 194 is coupled to the outlet tube 16 of the manifold core 12 via the tubing 226. The negative pressure path is defined from one the first and second bladders 20, 24, through one of the tubing 228, 230, through the manifold core 12 via the outlet tube 16, through the tubing 226, and to the pump 194 via the inlet port 240.

Referring still to FIGS. 11-25, the position 38-42, 120-128 of the connector 26 relative to the manifold core 12 changes the direction of the airflow through the manifold assembly 10. The airflow may be directed from the bladders 20, 24 to the pump 194, from the pump 194 to the bladders 20, 24, from a surrounding area into the bladders 20, 24, from the bladders 20, 24 to the surrounding area, or combinations thereof. As the pump 194 is configured to simultaneously provide positive and negative pressure, air is configured to flow in two directions through the manifold assembly 10 simultaneously. Further, air is configured to be directed to and from the surrounding area simultaneously.

The manifold assembly 10 is operable between a first operating state, a second operating state, and a release state. In the first operating state, which is a pressurized operating state, the pump 194 is configured to vacuum the air from the first bladders 20 and direct air into the second bladders 24. In the second operating state, which is a pressurized operating state, the pump 194 is configured to direct air into the first bladders 20 and vacuum the air from the second bladders 24. In the release state, the first and second bladders 20, 24 are in fluid communication with the surrounding area rather than the pump 194. In this way, the bladders 20, 24 are free from communication with the pump 194 in the release state. The fluid communication between the bladders 20, 24 and the surrounding area allows the bladders 20, 24 to return to a non-pressurized state, generally at atmospheric pressure or equilibrium. The position of the connector 26, and consequently the pathway regions 28, 30 and the release notches 32, 34, 170, 172, relative to the manifold core 12 determines whether the manifold assembly 10 is in the first operating state, the second operating state, or the release state.

Figure 12:
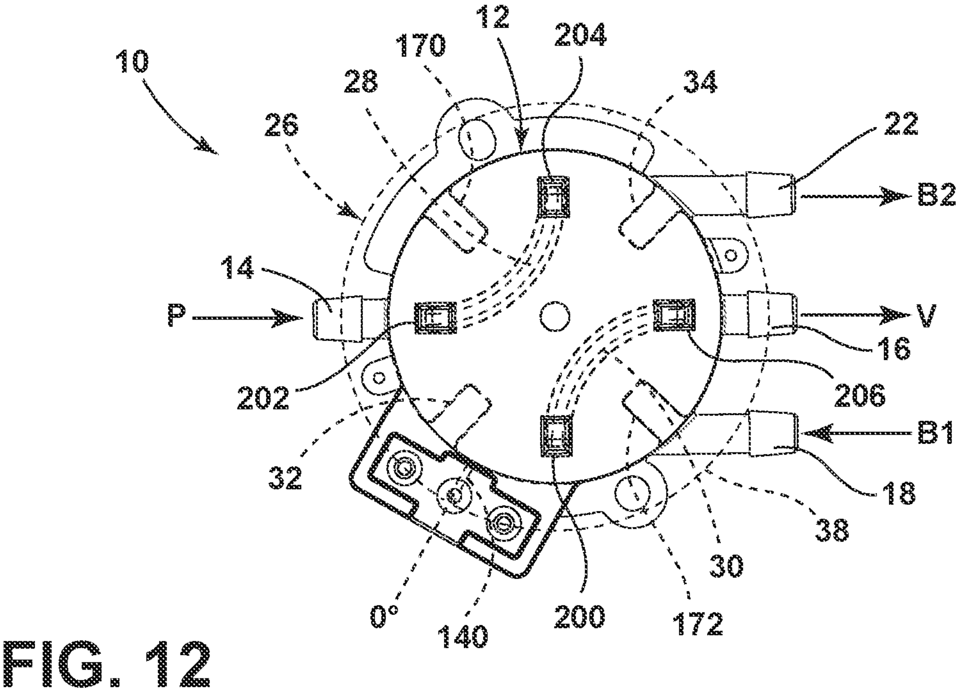
FIG. 12 is a top plan view of a manifold assembly with a connector in a first position for a first operating state, according to the present disclosure.
Figure 13:
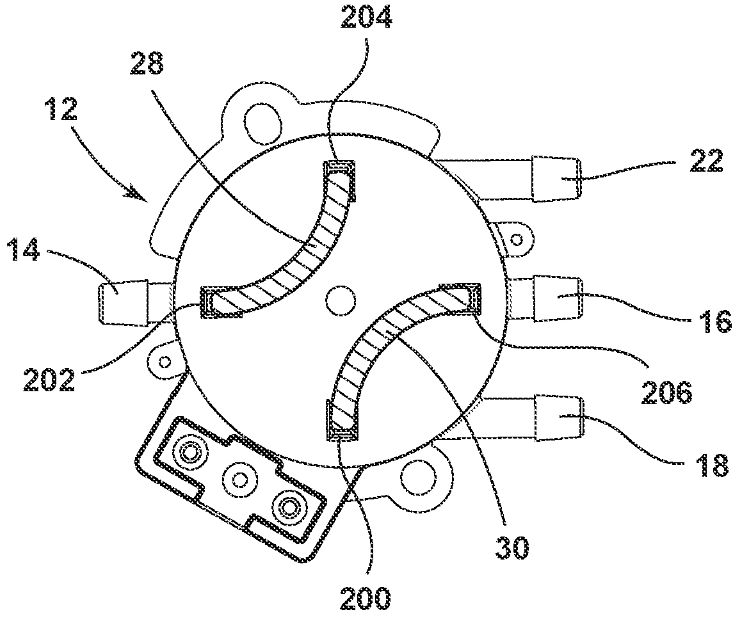
FIG. 13 is a top plan view of a manifold core showing pathway regions from a connector in a first position for a first operating state, according to the present disclosure.
Figure 14:
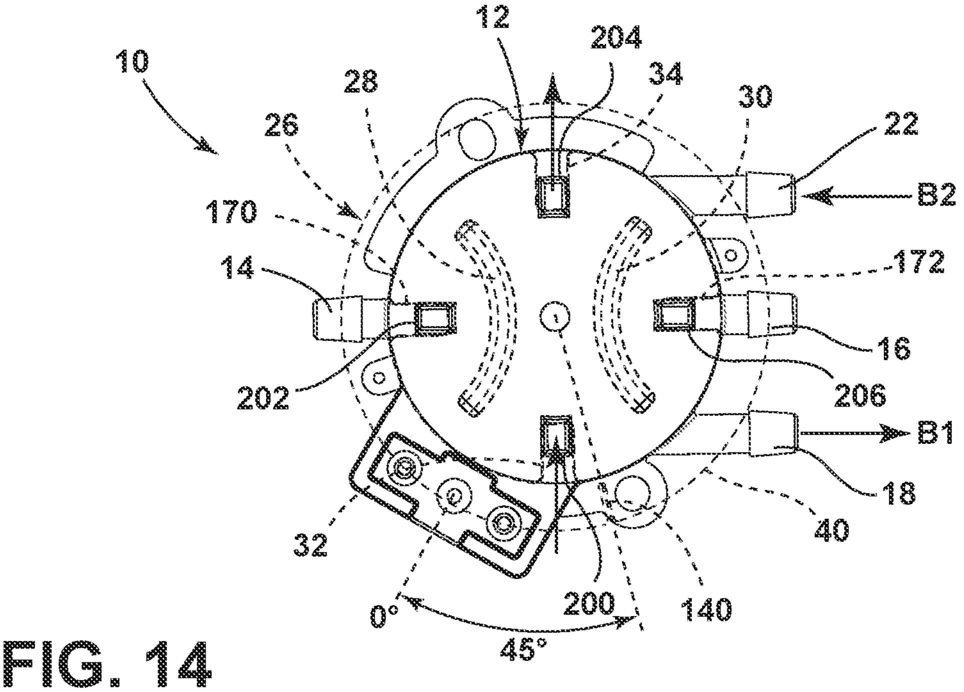
FIG. 14 is a top plan view of a manifold assembly with a connector in a second position for a release state, according to the present disclosure.

With reference to FIGS. 12-14, the connector 26 is disposed in the first position 38, which is part of the first pressurized operating state. The first position 38 is also the zero reference position relative to the optical switch 64. The connector 26 is positioned to fluidly couple the outlet tube 16 with the first projection 18, and consequently the first bladders 20, via the second pathway region 30 to vacuum air from the first bladders 20. In the first position 38, the inlet tube 14 is in fluid communication with the second projection 22 via the first pathway region 28 to direct air to the second bladders 24. Accordingly, the first bladders 20 in fluid communication with the first projection 18 are compressed, while the second bladders 24 in fluid communication with the second projection 22 are expanded. In this way, the negative pressure pathway (i.e., the vacuum) is defined partially by the first projection 18, the second pathway region 30, and the outlet tube 16, and the positive pressure path is partially defined by the inlet tube 14, the first pathway region 28, and the second projection 22.

Figure 15:
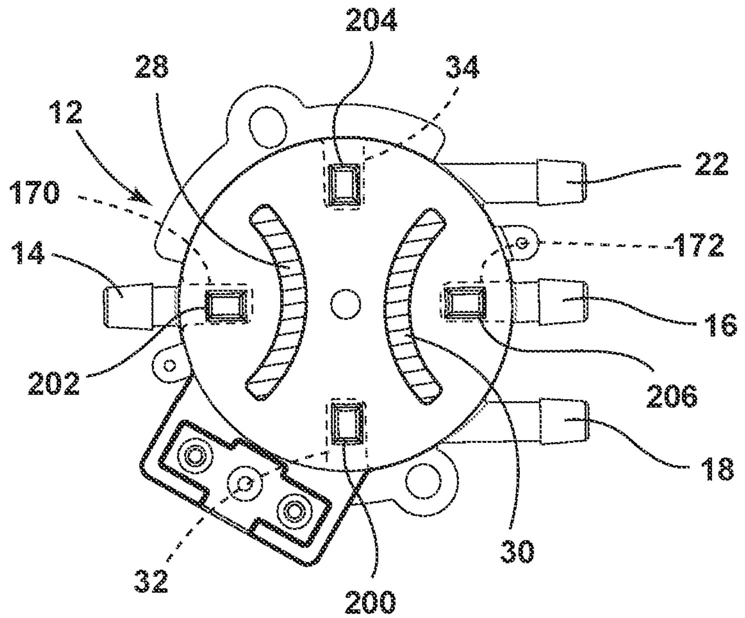
FIG. 15 is a top plan view of a manifold core showing pathway regions from a connector in a second position for a release state, according to the present disclosure.
Figure 16:
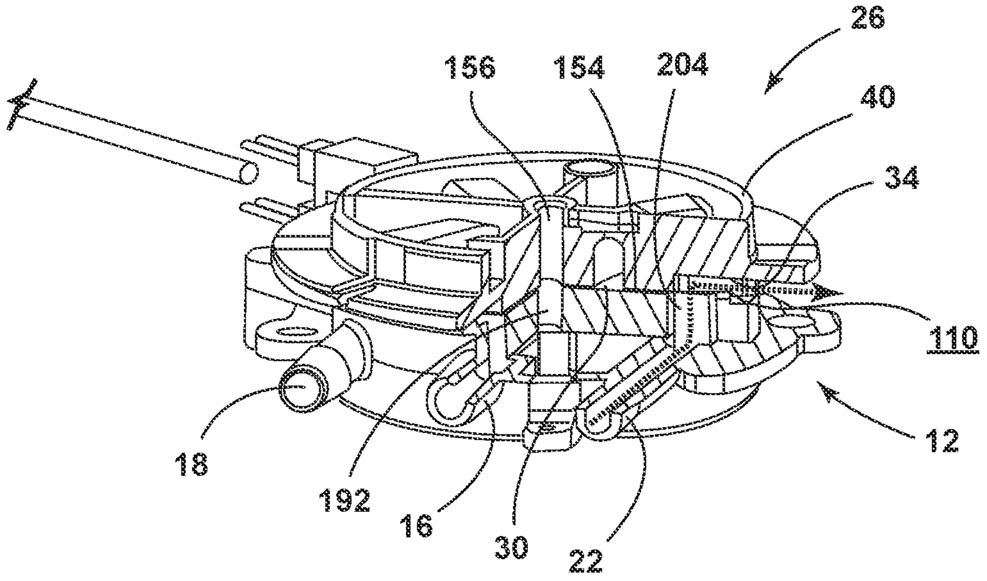
FIG. 16 is a side perspective view of a manifold assembly with a partial cutout of a connector and a manifold core to show an airflow path, according to the present disclosure.

With reference to FIGS. 14-16, the connector 26 is illustrated in the second position 40, which is part of the release state. The connector 26 is configured to rotate about 45° in a first direction, which is illustrated as a counterclockwise direction, from the first position 38 (FIG. 12) to the second position 40. In the release state, the bladders 20, 24 are free from fluid communication with the inlet and outlet tubes 14, 16 and, consequently, with the pump 194 and are instead in fluid communication with a surrounding area (e.g., atmosphere). The release state allows the bladders 20, 24 to adjust from the pressurized state to the non-pressurized state.

In the second position 40, the first release notch 32 is positioned over the first aperture 200 associated with the first projection 18 in fluid communication with the first bladders 20. The second release notch 34 is positioned over the third aperture 204 associated with the second projection 22 in fluid communication with the second bladders 24. The release notches 32, 34, provide openings to the surrounding environment to vent or exhaust air from the second bladders 24, which were under positive pressure when the connector 26 was in the first position 38, and add air to the first bladders 20, which were under negative pressure when the connector 26 was in the first position 38. In this way, in the release state, the negative airflow path is increased to equilibrium and the positive pressure path is decreased to equilibrium. Accordingly, the previously compressed first bladders 20 increase in size or inflate, and the previously expanded second bladders 24 decrease in size or deflate.

In an exemplary airflow path through the manifold assembly 10, as illustrated in FIG. 16, the airflow path between the second projection 22 and the surrounding area is illustrated. In the first position 38, the second bladders 24 were expanded by air being directed along the positive pressure path and into the second bladders 24. Accordingly, in the second position 40, air is configured to be vented from the second bladders 24, deflating the second bladders 24. The air flows through the inner channel defined by the second projection 22 and through the third aperture 204 defined by the manifold core 12. The air then flows between the connector 26 and the engagement surface 110 of the manifold core 12 within the second release notch 34 and is vented to an external area. The recessed nature of the release notch 34 relative to the surface of the central portion 154 of the connector 26 provides a space between the connector 26 and the manifold core 12 for fluid communication with the surrounding environment. Further, when the bladders 20, 24 are in a compressed state under a vacuum through air being drawn from the bladders 20, 24 along the negative pressure path, air flows through the opening between the release notch 34 and the engagement surface 110 to enter the bladders 20, 24 in an opposing direction than illustrated in FIG. 16.

Figure 17:
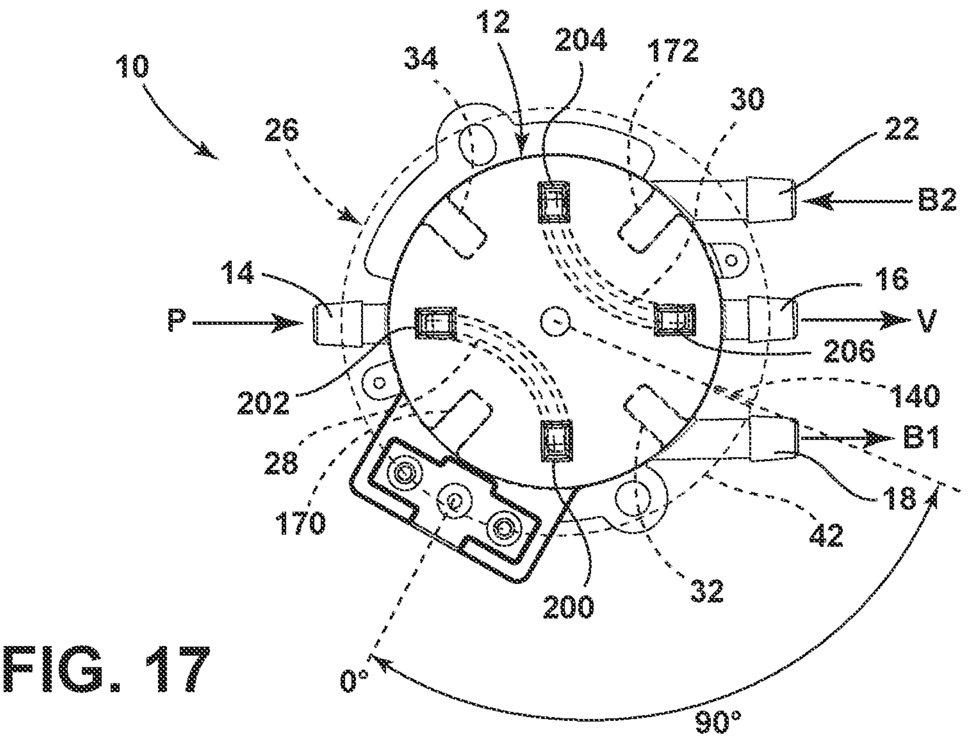
FIG. 17 is a top plan view of a manifold assembly with a connector in a third position for a second operating state, according to the present disclosure.
Figure 18:
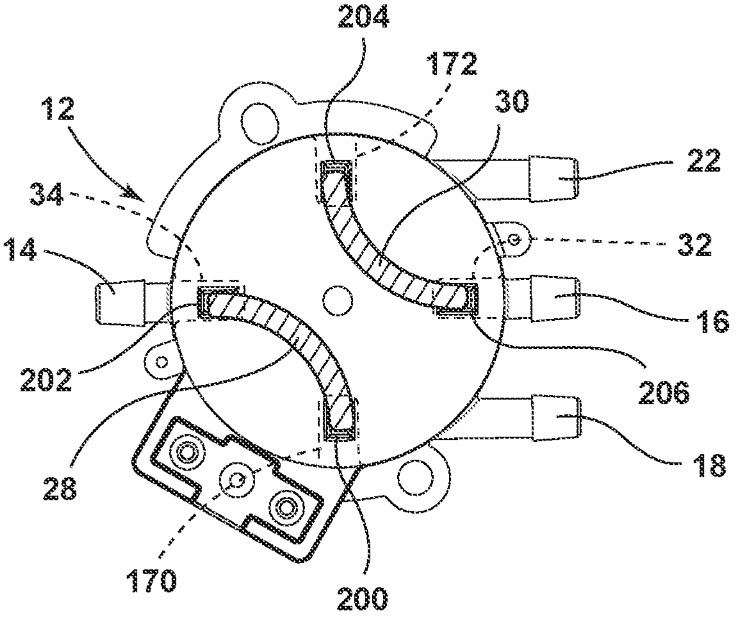
FIG. 18 is a top plan view of a manifold core showing pathway regions from a connector in a third position for a second operating state, according to the present disclosure.
Figure 19:
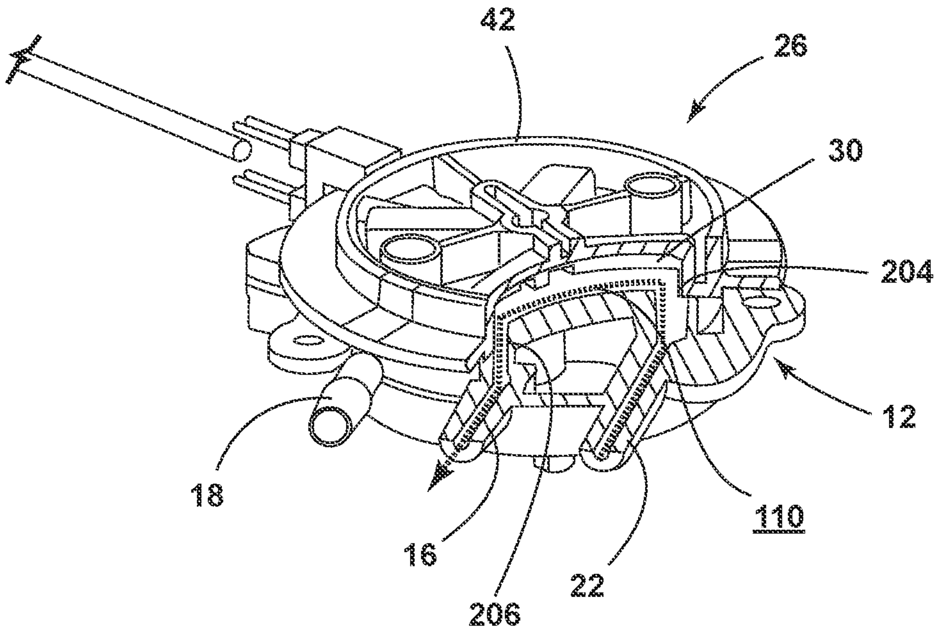
FIG. 19 is a side perspective view of a manifold assembly with a partial cutout of a connector and a manifold core to show an airflow path, according to the present disclosure.

With reference to FIGS. 17-19, the connector 26 is in the third position 42, which is part of the second pressurized operating state. The third position 42 is about 90° from the first position 38 and about 45° from the second position 40 in the first direction (e.g., counterclockwise). In the third position 42, the airflow paths are reversed relative to the first position 38. The inlet tube 14 is in fluid communication with the first projection 18 via the first pathway region 28, and the outlet tube 16 is in fluid communication with the second projection 22 via the second pathway region 30. In this way, the positive pressure path is defined by the inlet tube 14, the first pathway region 28, and the first projection 18, while the negative pressure path is defined by the outlet tube 16, the second pathway region 30, and the second projection 22. Accordingly, the first bladders 20 are expanded by positive pressure and the second bladders 24 are compressed by negative pressure.

In an exemplary airflow path through the manifold assembly 10, as illustrated in FIG. 19, the airflow path between the second projection 22 and the outlet tube 16 is illustrated. The air flows through the inner channel defined by the second projection 22 and through the third aperture 204 defined by the manifold core 12. The air then flows through a channel defined between the engagement surface 110 of the manifold core 12 and the first pathway region 28 defined by the connector 26. The air flows through the fourth aperture 206, through an inner channel defined by the outlet tube 16, and toward the pump 194.

Figure 20:
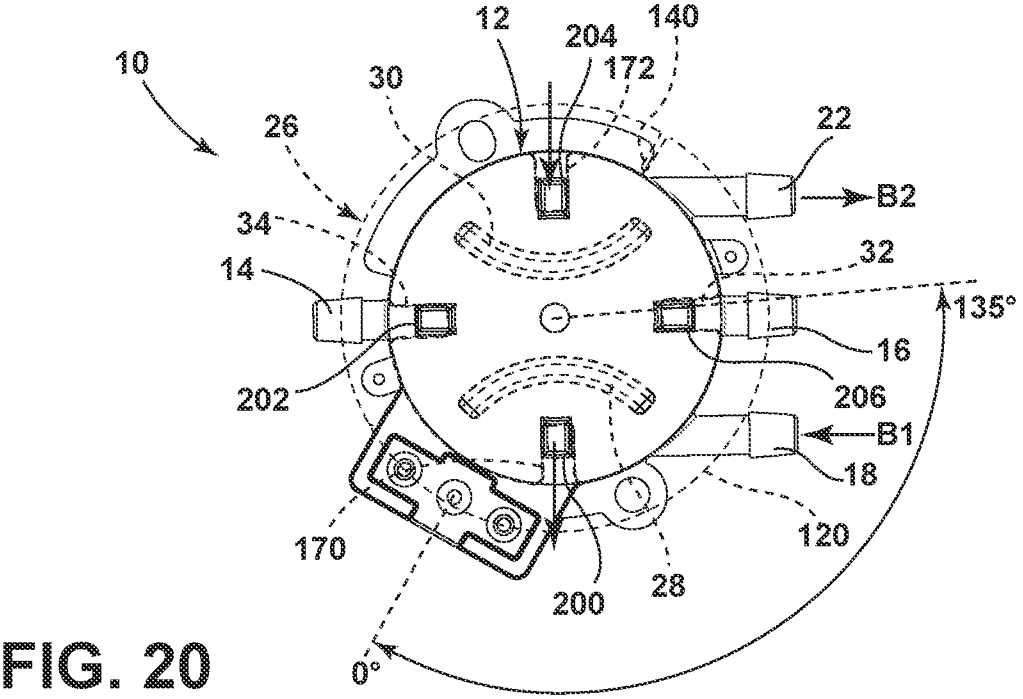
FIG. 20 is a top plan view of a manifold assembly with a connector in a fourth position for a release state, according to the present disclosure.
Figure 21:
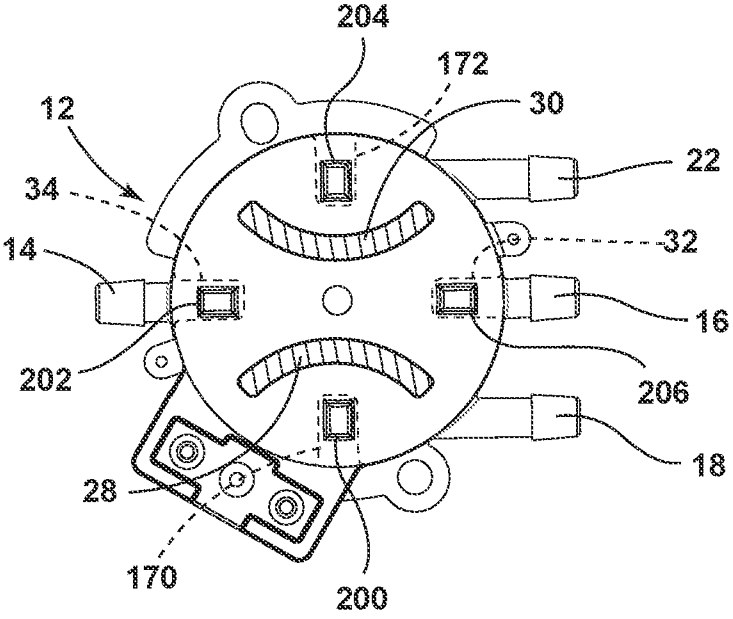
FIG. 21 is a top plan view of a manifold core showing pathway regions from a connector in a fourth position for a release state, according to the present disclosure.

Referring to FIGS. 20 and 21, the connector 26 is rotated in the first direction to the fourth position 120, which is about 45° from the third position 42 and about 135° from the first position 38 (i.e., the zero reference position). The fourth position 120 is part of the release state, aligning the apertures 200, 204 associated with the first and second projections 18, 22 with the third and fourth release notches 170, 172. The release notches 170, 172 allow the pressurized pathways to return to equilibrium. Based on the third position 42, when the connector 26 is rotated to the fourth position 120, the positively pressurized path in the first projection 18 is lowered to equilibrium, deflating the first bladders 20, while the negatively pressurized pathway in the second projection 22 is raised to equilibrium, inflating the second bladders 24.

Referring again to FIGS. 12-21, the connector 26 rotating from the first position 38 to the fourth position 120 completes a single cycle for the bladders 20, 24 fluidly coupled with the manifold assembly 10. In this way, each of the bladders 20, 24 has moved through a compressed condition under vacuum, a neutral condition generally at equilibrium, an expanded condition under positive pressure, and again to the neutral condition. When in the first pressurized operating state, the first bladders 20 are in the compressed condition while the second bladders 24 are in the expanded condition. In the second pressurized operating state, the first bladders 20 are in the expanded condition while the second bladders 24 are in the compressed condition. When in the release state, each of the first and second bladders 20, 24 are adjusted to and are held in the neutral condition.

Referring again to FIGS. 22-25, completing a single rotation of the connector 26, returning the connector 26 to the zero reference position (i.e., the first position 38), the bladders 20, 24 are adjusted through two full cycles of movement. The connector 26 is configured to rotate to the fifth position 122, as illustrated in FIG. 22, the sixth position 124, as illustrated in FIG. 23, the seventh position 126, as illustrated in FIG. 24, and the eighth position 128, as illustrated in FIG. 25.

Figure 22:
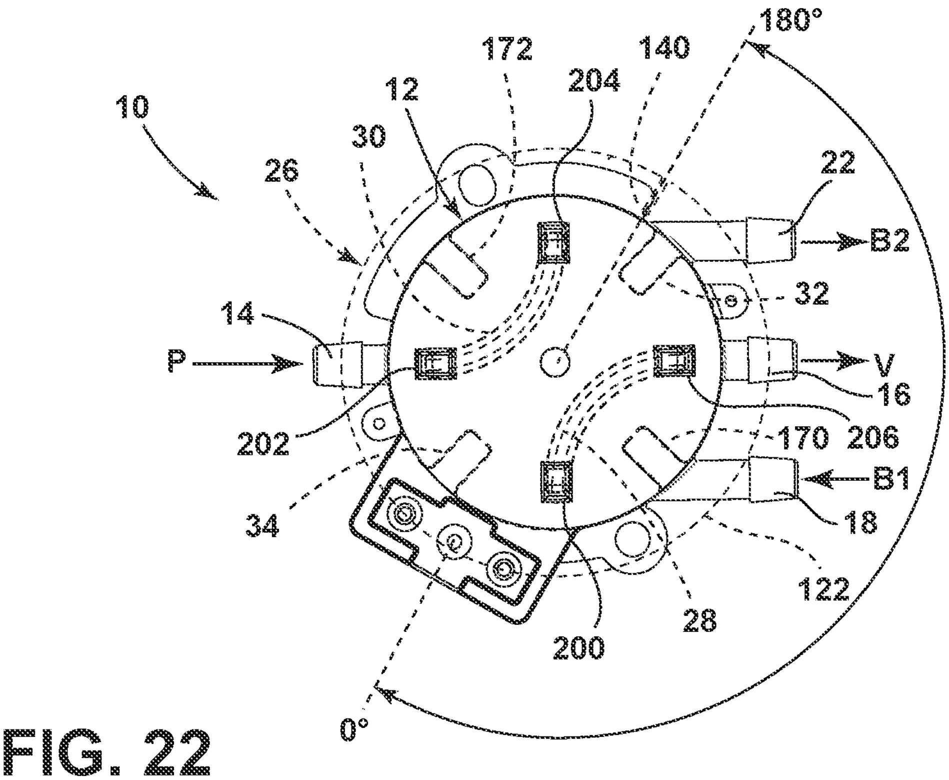
FIG. 22 is a top plan view of a manifold assembly with a connector in a fifth position for a first operating state, according to the present disclosure.

As illustrated in FIG. 22, the fifth position 122 is part of the first pressurized operating state. The connector 26 is rotated in the first direction about 45° from the fourth position 120 and about 180° from the first position 38. The inlet tube 14 is fluidly coupled with the second projection 22 via the second pathway region 30 to adjust the second bladders 24 to the expanded condition. The outlet tube 16 is fluidly coupled with the first projection 18 via the first pathway region 28 to adjust the first bladders 20 to the compressed condition.

Figure 23:
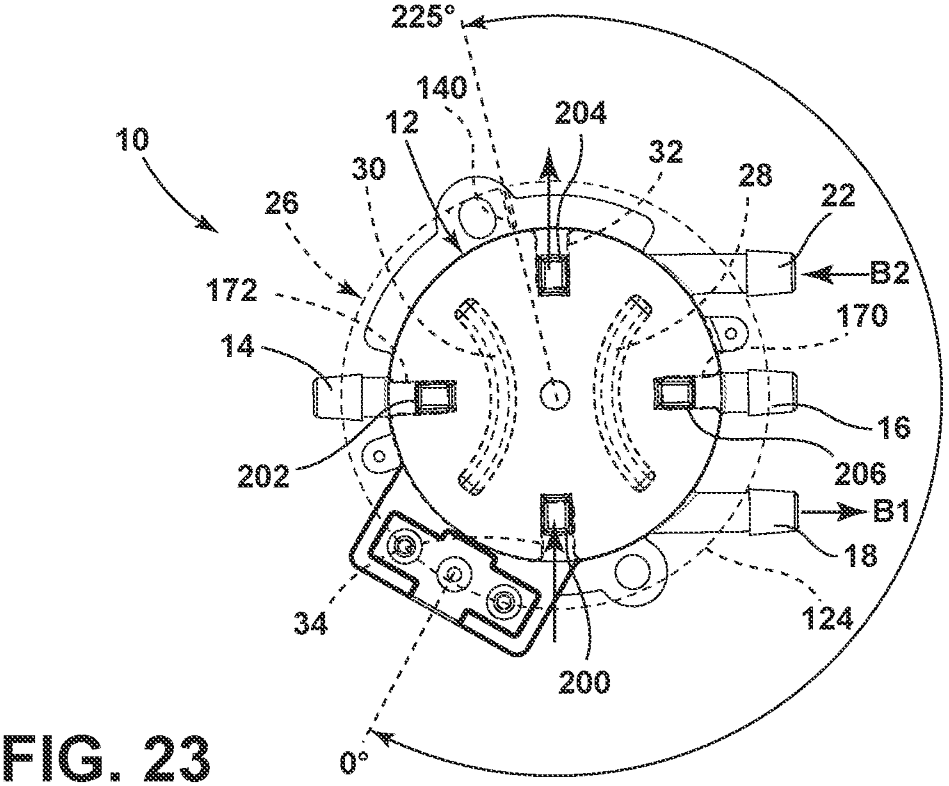
FIG. 23 is a top plan view of a manifold assembly with a connector in a sixth position for a release state, according to the present disclosure.

The sixth position 124, as illustrated in FIG. 23, is part of the release state. The connector 26 is rotated in the first direction about 45° from the fifth position 122 and about 225° from the first position 38. The first and second release notches 32, 34 notches align with the first and third apertures 200, 204 associated with the first and second projections 18, 22, respectively. Air is vented from the second bladders 24 to return the second bladders 24 to the neutral condition. Air flows into the first bladders 20 to return the first bladders 20 to the neutral condition.

Figure 24:
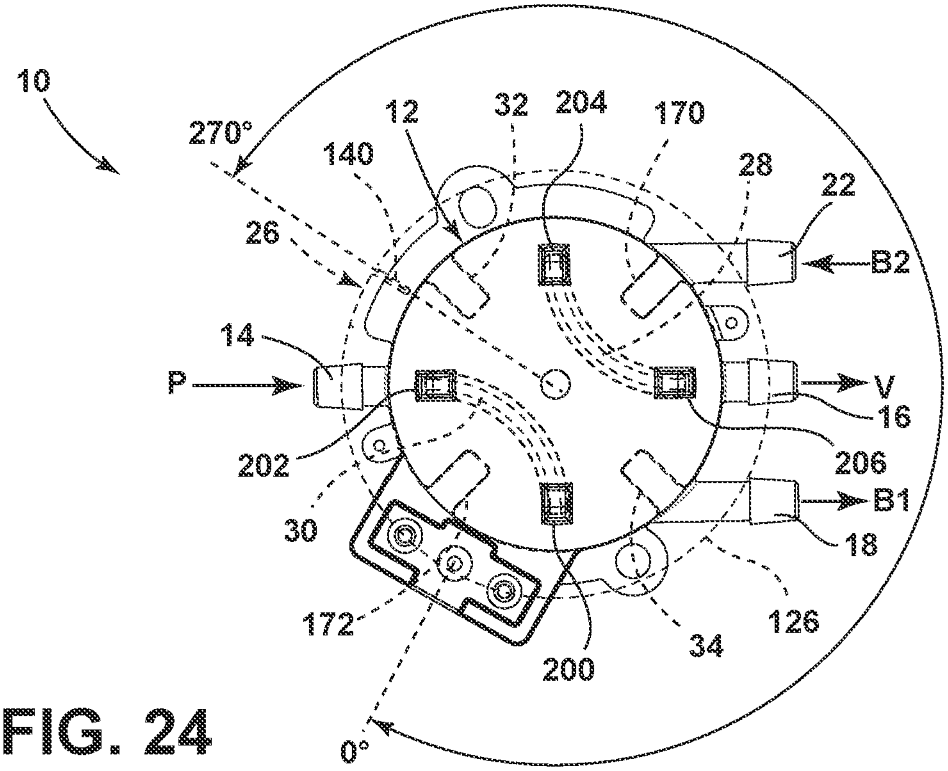
FIG. 24 is a top plan view of a manifold assembly with a connector in a seventh position for a second operating state, according to the present disclosure.
Figure 25:
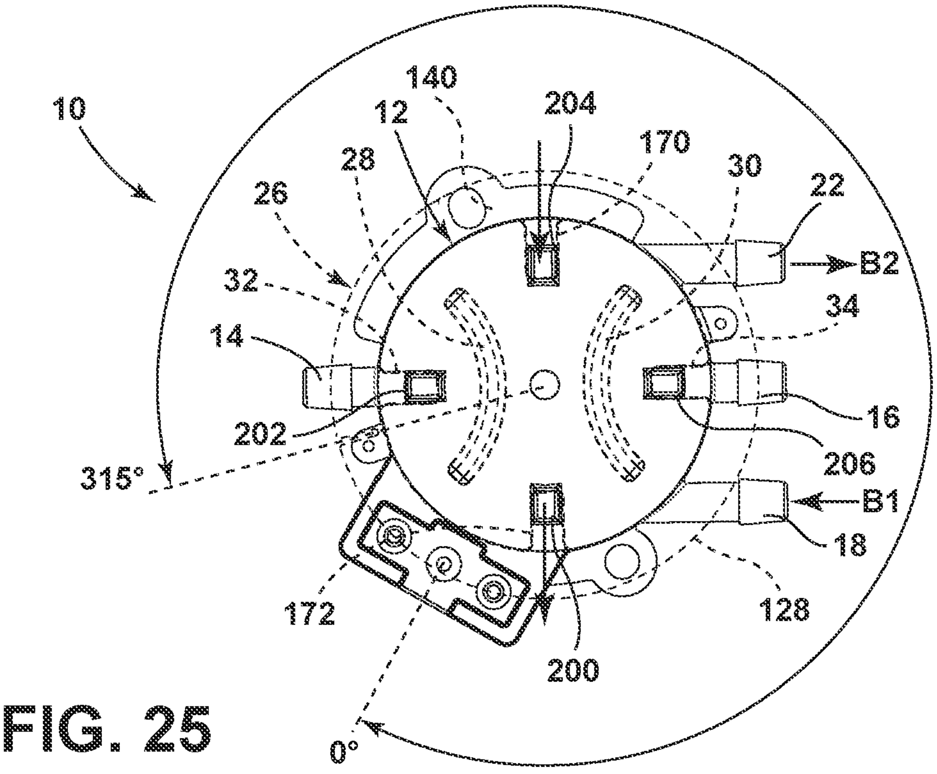
FIG. 25 is a top plan view of a manifold assembly with a connector in an eighth position for a release state, according to the present disclosure.

In the seventh position 126 illustrated in FIG. 24, the manifold assembly 10 is in the second pressurized operating state. The connector 26 is rotated in the first direction about 45° from the sixth position 124 and about 270° from the first position 38. The inlet tube 14 is fluidly coupled with the first projection 18 via the second pathway region 30 to adjust the first bladders 20 to the expanded condition. The outlet tube 16 is fluidly coupled with the second projection 22 via the first pathway region 28 to adjust the second bladders 24 to the compressed condition.

As illustrated in FIG. 25, the eighth position 128 is part of the release state. The connector 26 is rotated in the first direction about 45° from the seventh position 126 and about 315° from the first position 38. The third and fourth release notches 170, 172 align with the first and third apertures 200, 204 associated with the first and second projections 18, 22, respectively. Air is vented from the first bladders 20 to return the first bladders 20 to the neutral condition. Air flows into the second bladders 24 to return the second bladders 24 to the neutral condition. Accordingly, by the time the cover rotates 360° for a single rotation of the connector 26, the bladders 20, 24 have performed two full cycles of movement between the three different conditions.

Figure 26:
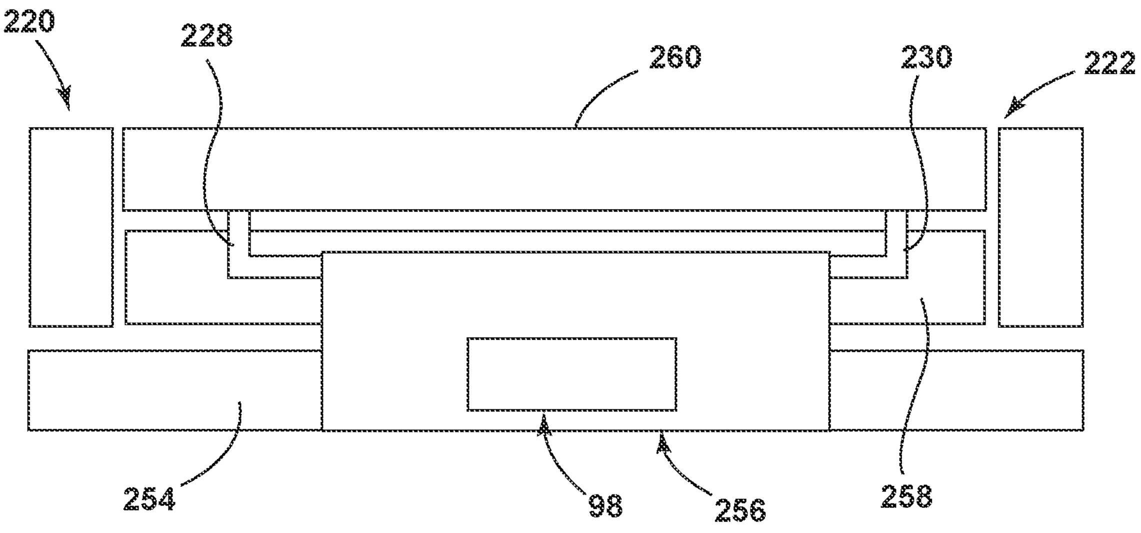
FIG. 26 is a schematic diagram of a surface assembly having a therapeutic layer in communication with a pneumatic enclosure, according to the present disclosure.
Figure 27:
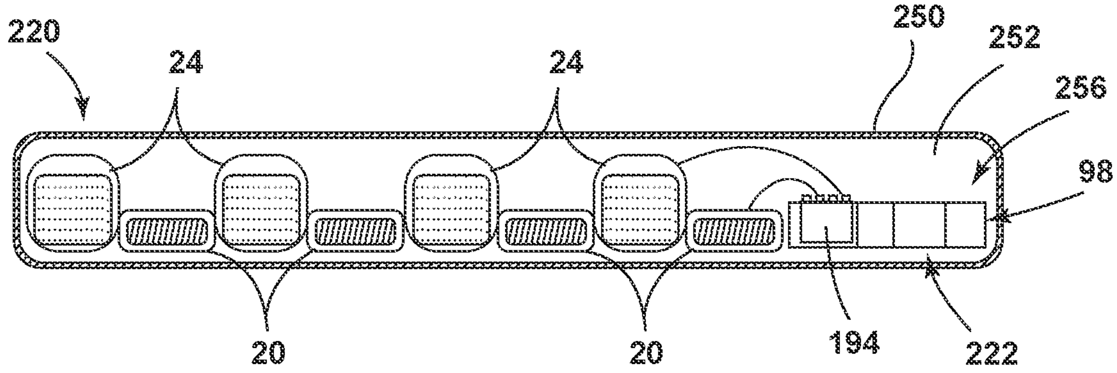
FIG. 27 is a schematic diagram of a surface assembly having a pneumatic enclosure in communication with first bladders and second bladders, according to the present disclosure.

With reference to FIGS. 26 and 27, the pneumatic system 222 that is included within the surface assembly 220, which may also be referred to as a mattress or therapeutic mattress. The surface assembly 220 generally includes a covering 250 defining an interior 252. Generally, the covering 250 is a ticking, which may be constructed of a flexible material that may be easily cleaned.

The surface assembly 220 includes a support base 254 which may be constructed of foam to provide support and structure for the surface assembly 220. The support base 254 may be generally U-shaped to retain various therapeutic elements within a center region of the surface assembly 220. A pneumatic enclosure 256, including the pump 194, the manifold assembly 10, and the control assembly 98, is positioned within the support base 254. An intermediate support layer 258 is disposed about the pneumatic enclosure 256 within the U-shaped support base 254. The intermediate support layer 258 is generally constructed of foam and provides additional support to the surface assembly 220 for supporting a patient. In certain aspects, the intermediate support layer 258 may provide an additional layer between the patient and the pneumatic enclosure 256.

The bladders 20, 24 are disposed within a therapeutic layer 260, which is positioned over the intermediate support layer 258 and within the U-shaped support base 254. The therapeutic layer 260 may extend along an entire length of the surface assembly 220. It is understood that portions of the therapeutic layer 260 may not include the bladders 20, 24, such as the portions that align with the head area of the patient. The tubing 228, 230 extends through the intermediate support layer 258 to engage the bladders 20, 24 in the therapeutic layer 260.

Figure 28:
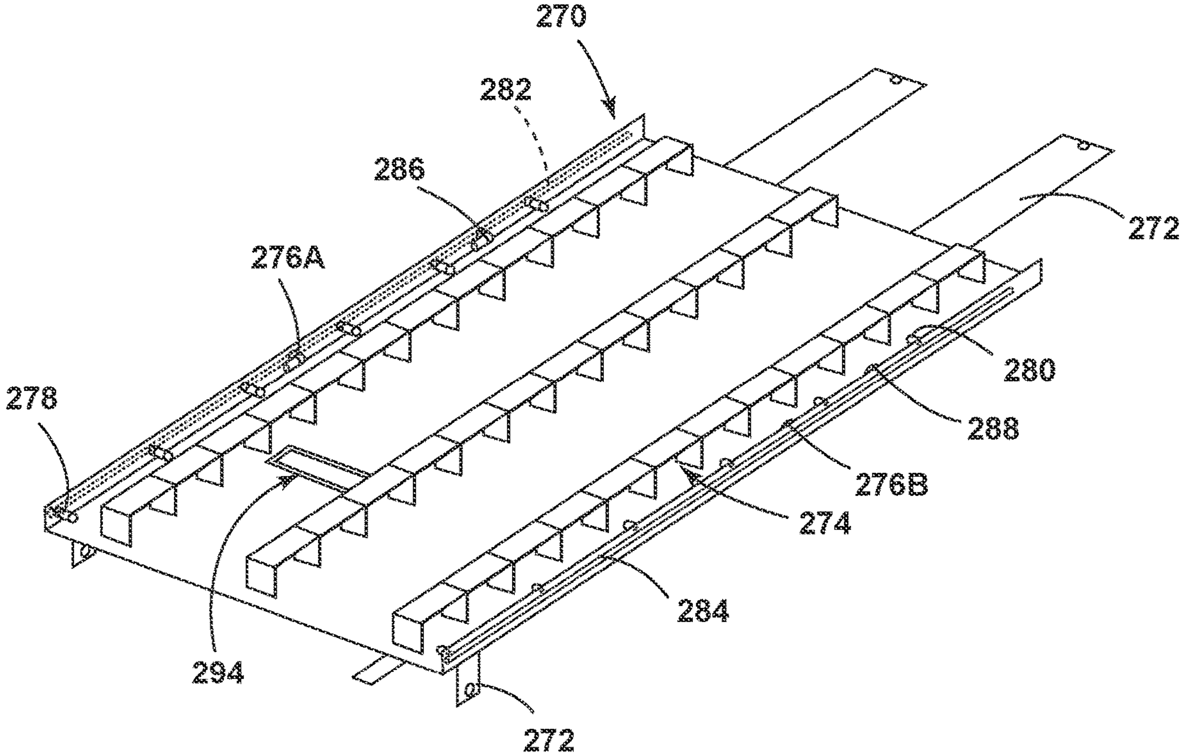
FIG. 28 is a top perspective view of a bladder base for supporting bladders of a pneumatic system, according to the present disclosure.
Figure 29:
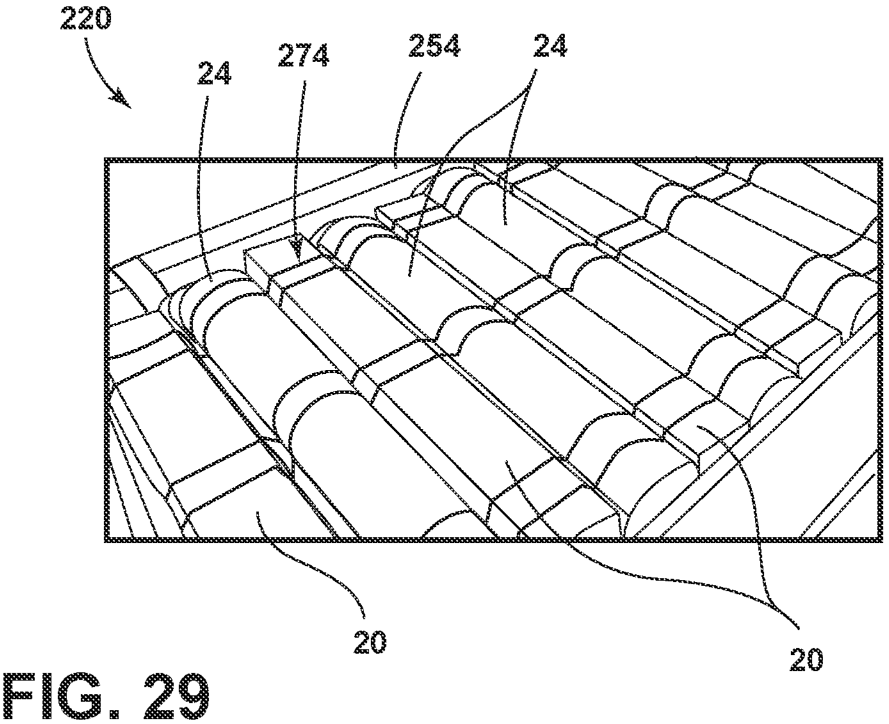
FIG. 29 is a top perspective view of a therapeutic layer with first bladders in a compressed condition and second bladders in an expanded condition, according to the present disclosure.
Figure 30:
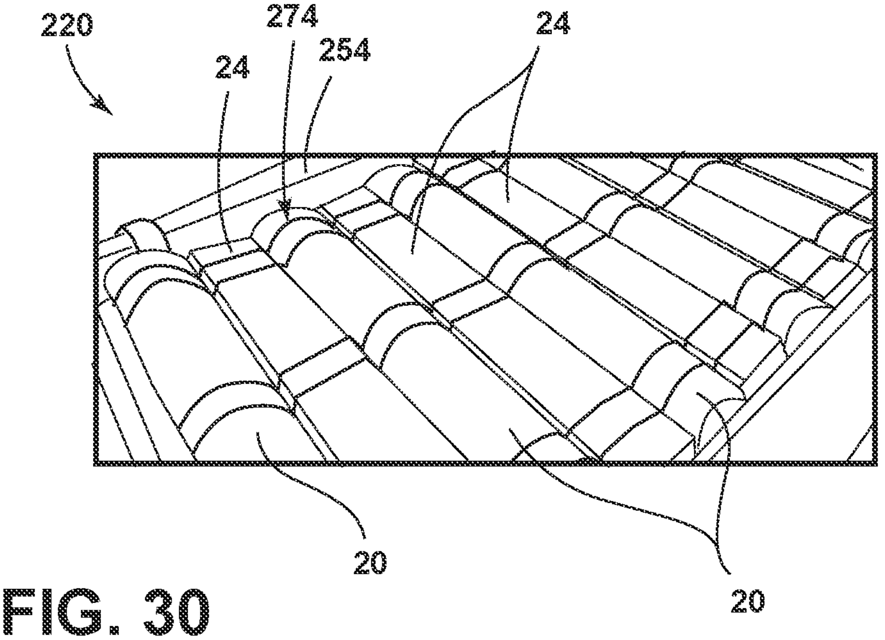
FIG. 30 is a top perspective view of the therapeutic layer of FIG. 29 with the first bladders in the expanded condition and second bladders in the compressed condition, according to the present disclosure.

Referring still to FIGS. 26 and 27, as well as to FIGS. 28-30, the therapeutic layer 260 of the surface assembly 220 includes a bladder base 270 for supporting and retaining the bladders 20, 24. The bladder base 270 provides a single surface and each of the bladders 20, 24 is disposed on this surface. The bladder base 270 includes attachment straps 272 for coupling the therapeutic layer 260 to the support base 254 and/or the covering 250 below the support base 254.

In the illustrated example, the therapeutic layer 260 includes twelve bladders 20, 24, with six first bladders 20 and six second bladders 24. Retaining bands 274 are coupled to the bladder base 270 to retain the bladders 20, 24 in position along the bladder base 270. The retaining bands 274 are arranged in twelve rows, for the twelve bladders 20, 24, and three columns, meaning each bladder 20, 24 is secured by three retaining bands 274. The three retaining bands 274 on each bladder 20, 24 are generally spaced apart, with one at each end of the respective bladder 20, 24 and one in the middle. The retaining bands 274 assist in reducing twisting of the bladders 20, 24, which may be caused by the change in pressure within the bladders 20, 24. Reducing the twisting of the bladders 20, 24 may be advantageous for increasing comfort of the patient. The retaining bands 274 may be configured to expand with the bladders 20, 24 in the expanded condition. Further, the retaining bands 274 may define the size and shape of the bladders 20, 24 in the expanded condition.

Each side of the bladder base 270 includes an inlet connector 276A, 276B. The inlet connectors 276A, 276B are configured to engage the tubing 228, 230 extending from the manifold assembly 10, respectively. The inlet connector 276A for the first bladders 20 is disposed on one side of the bladder base 270, while the inlet connector 276B for the second bladders 24 is disposed on an opposing side of the bladder base 270. This allows the tubing 228 for the first bladders 20 and the tubing 230 for the second bladders 24 to be disposed on opposing sides of the therapeutic layer 260, which may be advantageous for reducing interference with the tubing 228, 230 (e.g., kinking, etc.).

Each inlet connector 276A, 276B is in fluid communication with a set of feed connectors 278, 280, respectively. The feed connectors 278, 280 are configured to fluidly couple the respective inlet connector 276A, 276B with the respective bladders 20, 24. Additional tubing 282, 284 extends between the inlet connectors 276A, 276B and the associated set of feed connectors 278, 280, respectively. In the example with twelve bladders 20, 24, there are six feed connectors 278 on one side of the bladder base 270 to couple with the six first bladders 20 and six feed connectors 280 on the opposing side of the bladder base 270 to couple with the six second bladders 24.

Referring still to FIGS. 26-30, the therapeutic layer 260 is in fluid communication with the control assembly 98. The bladder base 270 includes two measurement ports 286, 288, with one on each side of the bladder base 270. Each measurement port 286, 288 is in fluid communication with the respective inlet connector 276A, 276B and the respective feed connectors 278, 280 on the same side of the bladder base 270. The measurement ports 286, 288 are in fluid communication with sensors 290 via sensing tubes 292 (see FIG. 11) to sense the pressure during operation of the pneumatic system 222 and communicate the sensed pressure to the control assembly 98 for monitoring. The control assembly 98 may be configured to generate and communicate an alert when the sensed pressure is outside a predetermined range based on the operation of the pneumatic system 222.

The therapeutic layer 260 with the bladders 20, 24 may also be used with other therapeutic devices and assemblies. For example, the bladder base 270 defines an opening 294 to couple a microclimate management (MCM) system to the control assembly 98 below the therapeutic layer 260. The MCM system may be selectively disposed over and positioned on the therapeutic layer 260. The MCM system generally includes a blower, a top coverlet, and a spacer material within the top coverlet. The blower operates to direct or blow air through the spacer material. The patient may rest on the MCM system and, while the patient is positioned on the MCM system, air is directed through the top coverlet. This configuration wicks away moisture from the skin of the patient by blowing air underneath the patient, which is advantageous for preventing skin conditions that may be caused by lying on the surface assembly 220 for an extended period of time.

Figure 31:
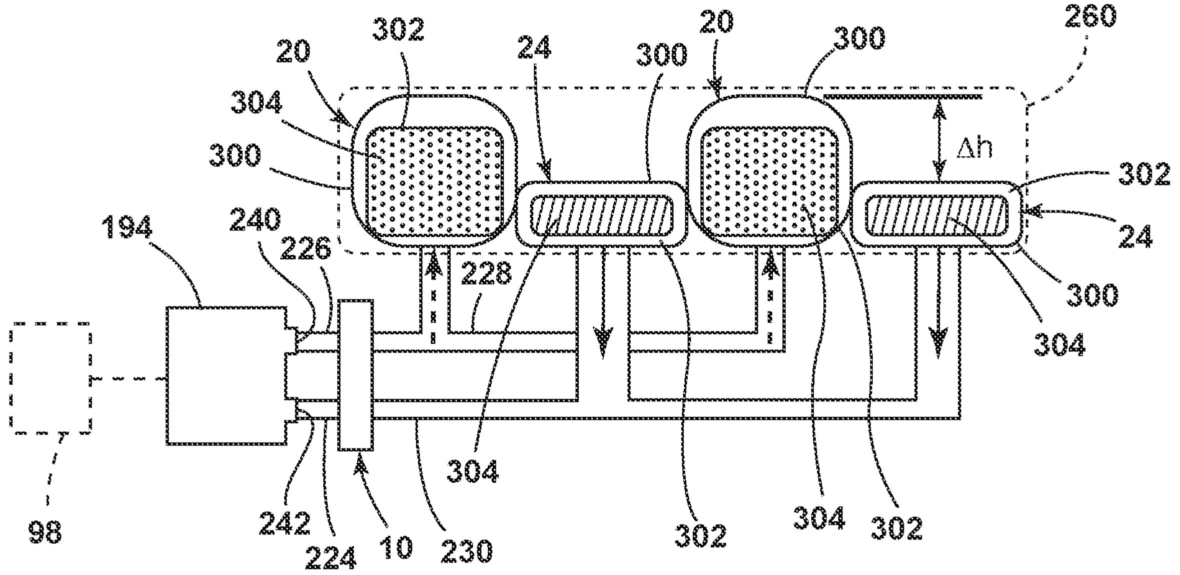
FIG. 31 is a schematic view of a pneumatic system with first bladders in an expanded condition and second bladders in a compressed condition, according to the present disclosure.
Figure 32:
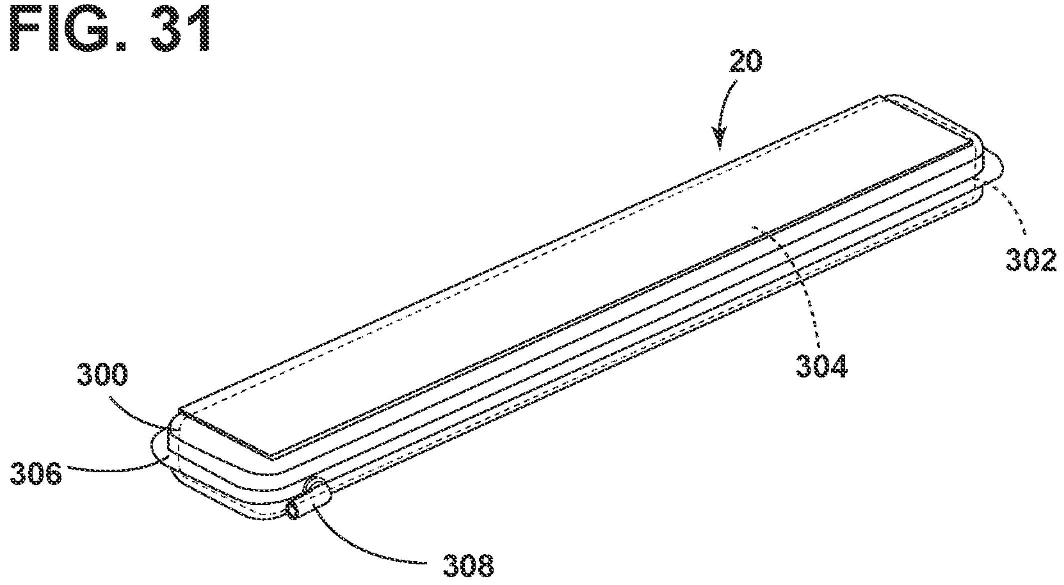
FIG. 32 is a side perspective view of a bladder for a pneumatic system, according to the present disclosure.

Referring still to FIGS. 29 and 30, as well as FIGS. 31 and 32, the pneumatic system 222 is configured to provide alternating low pressure (ALP) therapy to the patient. In this way, the first and second bladders 20, 24 are adjusted in an alternating cycle, with the first bladders 20 compressing while the second bladders 24 expand and the first bladders 20 expanding while the second bladders 24 compress. The adjustment of the bladders 20, 24 is based on the position of the connector 26 of the manifold assembly 10 as described herein.

The pump 194 is fluidly coupled to the bladders 20, 24 within the surface assembly 220 via the manifold assembly 10 and the tubing 224, 226. The bladders 20, 24 are arranged as two sets with the first bladders 20 alternating with the second bladders 24. It is contemplated that multiple groupings of the first and second bladders 20, 24 may be utilized, such as in different locations of the surface assembly 220. In such examples, one grouping, such as in a chest region, may be adjusted to provide the ALP therapy while a second grouping, such as in a leg region, may remain in a deactivated or neutral condition.

The bladders 20, 24 extend across a width of the surface assembly 220 and are arranged in an alternating pattern adjacent to one another along a length of the surface assembly 220. Each bladder 20, 24 is constructed of an outer membrane 300 defining an enclosure 302 and an elongated core 304 positioned within the enclosure 302. The outer membrane 300 is air impermeable and flexible, allowing the bladders 20, 24 to adjust between expanded and compressed conditions. One non-limiting example of the outer membrane 300 includes polyurethane. The outer membrane 300 may have elasticity, such that the outer membrane 300 stretches or expands in the expanded condition.

The outer membrane 300 is generally constructed of two shells which are welded at a seam 306. Generally, the outer membrane 300 is formed using high-frequency welding. The seam 306 extends around side edges of the core 304, preventing the seam 306 from interacting with the patient to reduce an interface pressure that can contribute to pressure injury development. Bladder connectors 308 are coupled to the outer membrane 300, providing fluid communication with the enclosure 302. The bladder connectors 308 are generally disposed along or adjacent to the seam 306. The bladder connectors 308 may be coupled to the outer membranes 300 via welding and are in fluid communication with the respective feed connectors 278, 280 when the bladders 20, 24 are disposed on the bladder base 270.

The core 304 is generally constructed of an air-permeable (e.g., porous) and resilient or elastically deformable foam material. The foam material is configured to compress under vacuum conditions and automatically expand due to the resilient nature of the foam to the neutral condition. The cores 304 provide support for the patient when the bladders 20, 24 are in the neutral condition and when the pneumatic system 222 is in a non-powered state. Further, the cores 304 prevent a bottoming effect felt by the patient. The shape of the core 304 is configured to define the shape of the bladders 20, 24 when the bladders 20, 24 are in the neutral condition. The shape of the compressed core 304 is also configured to define the shape of the bladders 20, 24 in the compressed condition. When the bladders 20, 24 are expanded, air is directed into the enclosure 302, adjusting the outer membrane 300 away from the core 304. The core 304 remains the same as in the neutral condition.

Figure 33:
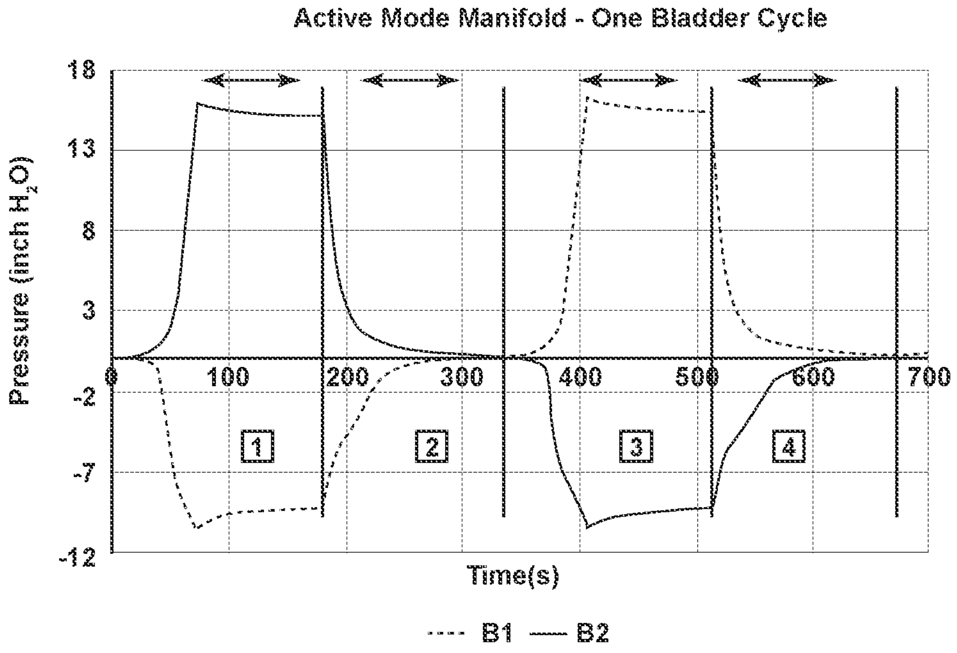
FIG. 33 is a graph illustrating bladder pressure during one cycle of alternating low pressure therapy, according to the present disclosure.
Figure 34:
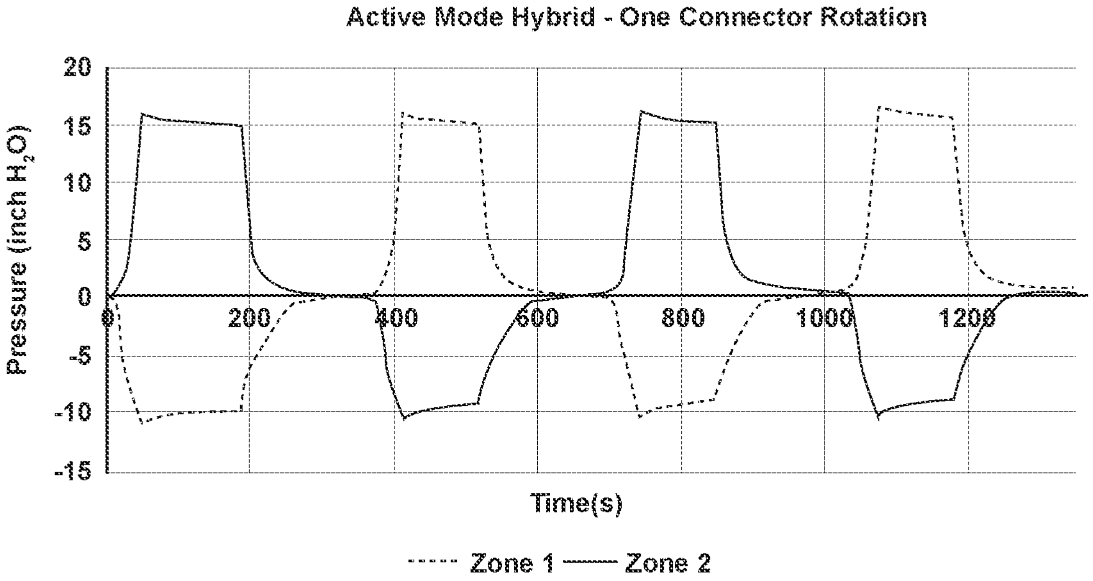
FIG. 34 is a graph illustrating bladder pressure during one rotation of a connector during alternating low pressure therapy, according to the present disclosure.

Referring again to FIG. 31, as well as FIGS. 33 and 34, the first and second bladders 20, 24 are configured to be adjusted independently of one another when the pneumatic system 222 is in a powered state. In the powered state, the pneumatic system 222 alternates between the first operating state and the second operating state. For one cycle of the ALP therapy, the pneumatic system 222 adjusts to the first operating state, the release state, the second operating state, and again to the release state. It is also contemplated that the pneumatic system 222 may adjust directly between the first operating state and the second operating state, bypassing the release state. In such examples, the connector 26 may bypass the release positions 40, 44, 120, 124, 128 to directly vacuum air from the expanded bladders 20, 24 and add air to the compressed bladders 20, 24.

The pump 194 is configured to drive fluid into the first bladders 20, increasing a size of the first bladders 20 relative to the neutral condition. At the same time, the pump 194 is configured to evacuate fluid from the second bladders 24 to the compressed condition, decreasing the size of the second bladders 24 relative to the neutral condition. During expansion, an interface pressure between the patient and the first bladders 20 is increased. During the evacuation, an interface pressure between the patient and the second bladders 24 is reduced or removed.

The height difference between the expanded condition and the compressed condition provides a change in the shape of a support surface of the surface assembly 220. The expanded bladders 20, 24 may press against the support surface, while the compressed bladders 20, 24 may be adjusted away from the support surface. The change in shape results in low pressure areas where the bladders 20, 24 are compressed. The expansion of the first bladders 20 in conjunction with the compression of the second bladders 24 provides for a greater height difference between the first and second bladders 20, 24, creating a greater local discharge of pressure contact between the patient and the surface assembly 220 to allow for re-oxygenation of cells and increase blood circulation.

Referring still to FIGS. 31, 33, and 34, when the bladders 20, 24 are in the neutral condition, the bladders 20, 24 are at atmospheric pressure or equilibrium. In the neutral condition, the bladders 20, 24 are at a pressure of about zero inches of water ("$H_2O$). When the bladders 20, 24 are adjusted to the expanded condition, the bladders 20, 24 reach a pressure of about 15 "$H_2O$+/−about 10%. The positive internal pressure for the expanded condition is generally reached from equilibrium in less than about 120 seconds. When the bladders 20, 24 are adjusted to the compressed condition, the bladders 20, 24 reach a pressure minimum of about −10 "$H_2O$+/−about 20%. The negative internal pressure for the compressed condition is generally reached from equilibrium in less than about 120 seconds. The speed of adjustment from either pressurized condition to equilibrium is generally greater than about 60% of the end pressure within about 30 seconds in a flat position of the surface assembly 220 in a mid-level or medium setting. The pressure values may be based on a P50 male patient and may remain the same for other patients or may be adjusted accordingly or based on the setting and/or the position of the surface assembly 220.

The pump 194 is configured to deliver an airflow of at least about 10 L/mm at free flow and a minimum pressure of about 40 "$H_2O$ relative pressure at a blocked flow. Further, the pump 194 is configured to deliver both positive and negative pressure (vacuum) with suction airflow of at least about 10 L/mm at free flow and a minimum pressure of about +/−40 "$H_2O$ relative pressure at a blocked flow.

The pneumatic system 222 is configured to adjust to the first operating state by adjusting the connector 26 to the first position 38, with the first bladders 20 compressed and the second bladders 24 expanded. The pump 194 is activated until the bladders 20, 24 reach the predefined pressures. The pump 194 is then deactivated to maintain the condition of the bladders 20, 24 for a predefined period of time. In this state, the pneumatic system 222 is closed. The pneumatic system 222 is configured to open in the release state by adjusting the connector 26 to the second position 40. The bladders 20, 24 adjust to equilibrium and are maintained at equilibrium in the neutral condition for a predefined period of time. The connector 26 is then adjusted to the third position 42, adjusting the pneumatic system 222 to the second operating state with the second bladders 24 compressed and the first bladders 20 expanded. The pump 194 is then deactivated to maintain the condition of the bladders 20, 24 for a predefined period of time. The pneumatic system 222 is configured to open in the release state by adjusting the connector 26 to the fourth position 120, allowing the bladders 20, 24 to return to equilibrium.

As illustrated in FIG. 33, the first through fourth positions 38, 40, 42, 120 of the connector 26 result from a 180° rotation of the connector 26 and cause one full cycle of the bladders 20, 24. As illustrated in FIG. 34, the bladders 20, 24 complete a second cycle as the connector 26 is adjusted through the fifth through eighth positions 122, 124, 126, 128. Accordingly, a 360° rotation of the connector 26 through the first through eighth positions 38-40, 120-128 causes two full cycles of the bladders 20, 24. The connector 26 is configured to continue rotating, causing the alternating cycle of pressure with the first and second bladders 20, 24, based on the ALP therapy program. The amount of time for the ALP therapy and the time the bladders 20, 24 are maintained in each condition may be set and adjusted by the caregiver.

When the surface assembly 220 is in the non-powered condition, the bladders 20, 24 are in the neutral condition and provide comfort and support for the patient. When the first and second bladders 20, 24 are in the neutral condition, the size and shape of the cores 304 define the size and shape of the respective first and second bladders 20, 24. Upper surfaces of the first and second bladders 20, 24 are generally co-planar when in the neutral condition to provide a generally planar support surface of the surface assembly 220. The upper surfaces may not be completely planar but may form a generally flat or planar surface. The upper surfaces are generally aligned, but it is contemplated that the upper surfaces may be minimally offset from one another. The upper surfaces may have some degree of curvature or deformation caused by the shape of the first and second bladders 20, 24, the patient disposed on the surface assembly 220. It is also contemplated that in the compressed condition, the upper surfaces are also generally flat. In the expanded condition, the upper surfaces of the bladders 20, 24 may be more rounded.

Figure 35:
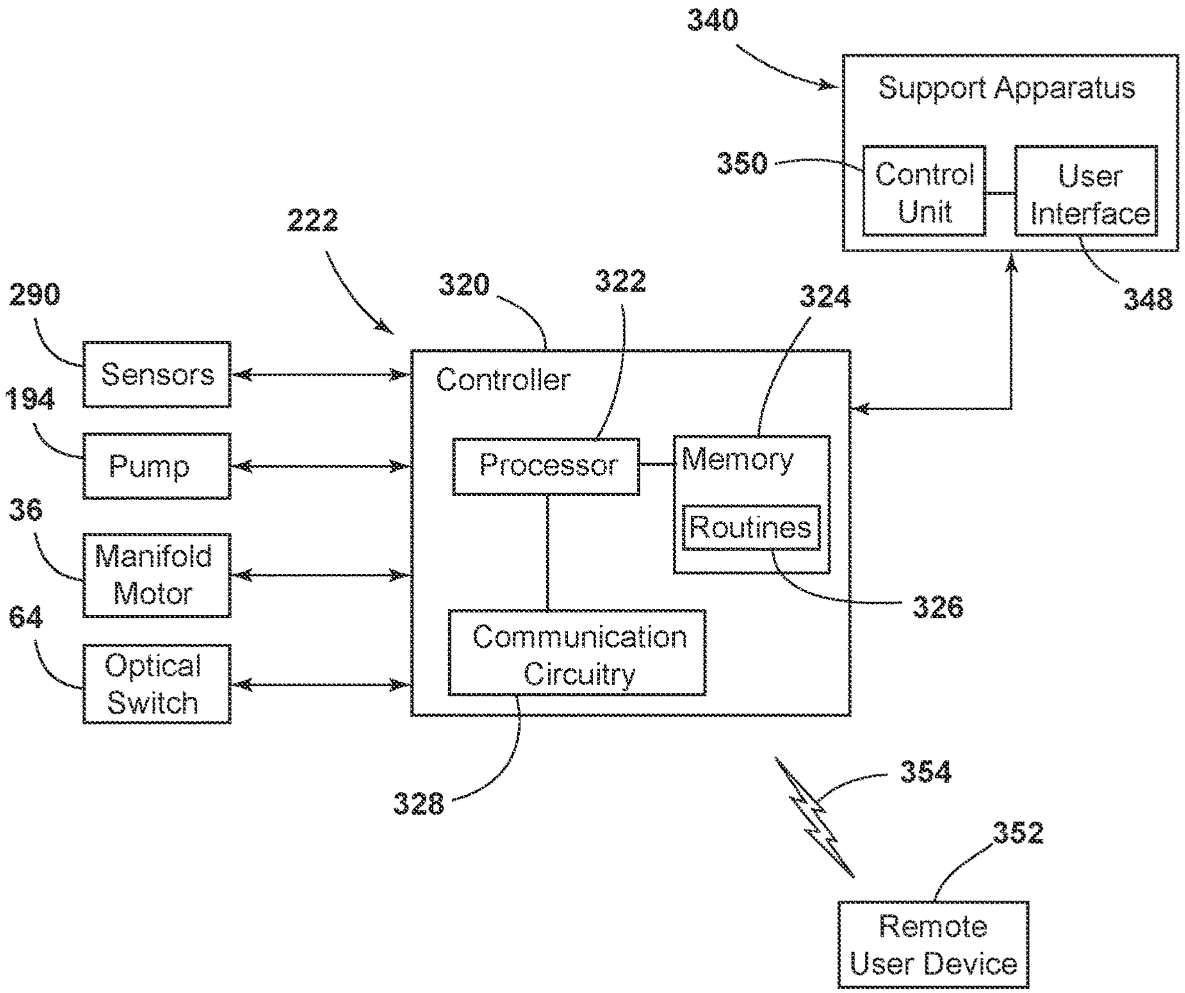
FIG. 35 is a block diagram of a pneumatic system in communication with a support apparatus, according to the present disclosure.

With reference to FIG. 35, the control assembly 98 of the pneumatic system 222 includes a controller 320 having a processor 322, a memory 324, and other control circuitry. Instructions or routines 326 are stored in the memory 324 and executable by the processor 322. The controller 320 may also include communication circuitry 328 for bidirectional wired and wireless communication. In various aspects, the controller 320 includes routines 326 related to the activation and control of the steps of the motor 36. The steps of the motor 36 each correspond to one of the positions 38-42, 120-128 of the connector 26.

Additionally, the controller 320 is in communication with the optical switch 64. The controller 320 may be configured to monitor the position 38-42, 120-128 of the connector 26 based on the zero reference point (e.g., with the reference notch 140). Further, the controller 320 may compare the positions of the connector 26 with predefined positions 38-42, 120-128 relative to the zero reference point to monitor the accuracy of the manifold assembly 10.

The controller 320 is also communicatively coupled with the sensors 290 in fluid communication with the measurement ports 286, 288. The sensors 290 are configured to sense the pressure within the pneumatic system 222 and communicate the sensed pressure to the controller 320. The controller 320 may be configured to monitor the sensed information and alert the caregiver when the sensed pressure is outside the predefined ranges based on the ALP therapy. Using the sensed information, the controller 320 may be able to distinguish whether the first bladders 20 and/or the second bladders 24 are outside the predefined range, which may assist the caregiver in determining a cause of the change in pressure to be outside the predefined range.

Figure 36:
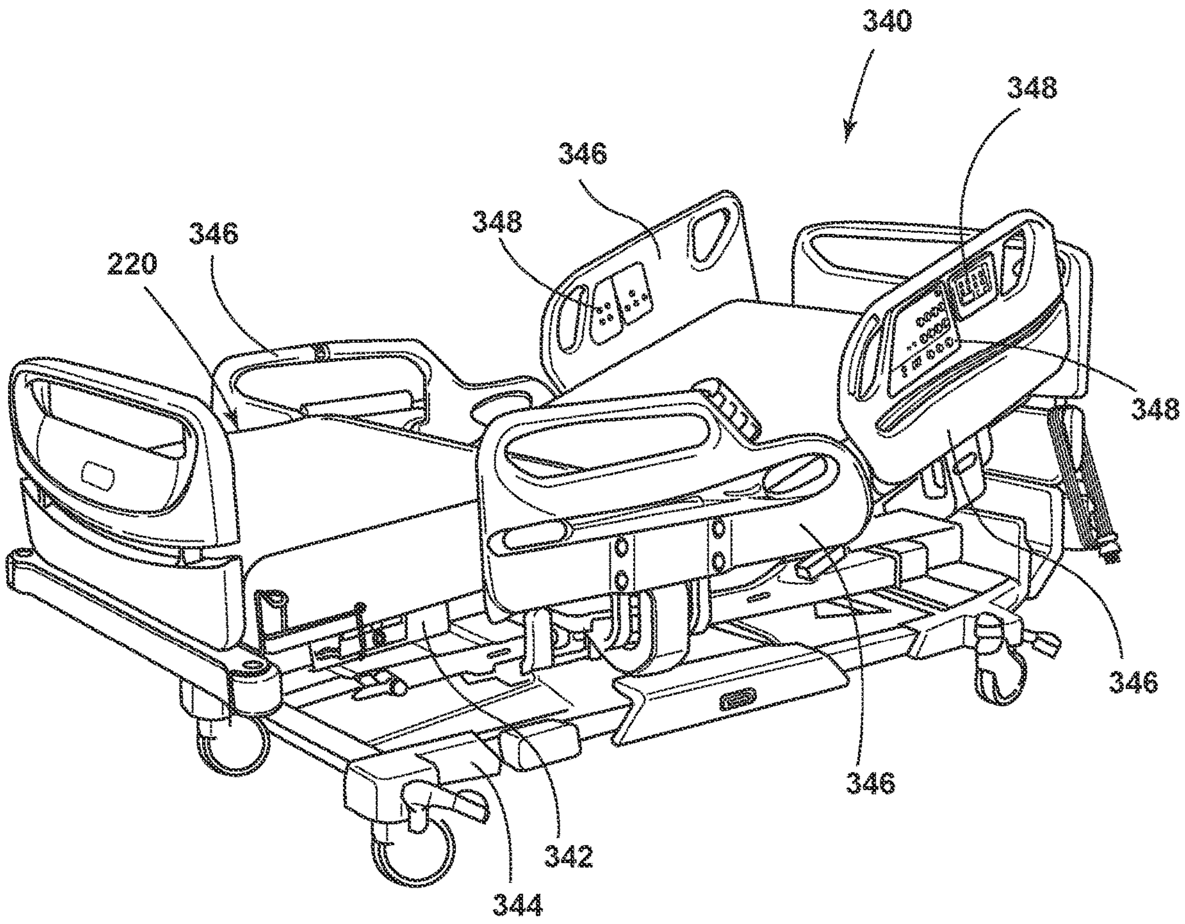
FIG. 36 is a side perspective view of a support apparatus, according to the present disclosure.

With reference to FIG. 36, the surface assembly 220 is utilized on a support apparatus 340, which is illustrated as a medical bed. In such examples, the support apparatus 340 includes an upper frame 342 and a base frame 344. The upper frame 342 is generally adjustable relative to the base frame 344 (e.g., height, tilt, etc.). The upper frame 342 may include multiple segments that are independently movable relative to each other. The independently movable segments allow for various portions of the upper frame 342 to be adjusted (e.g., an elevated head region, a lowered foot region, etc.). The segments collectively form a surface for supporting the surface assembly 220.

The support apparatus 340 includes multiple siderails 346, which are operable between the raised and lowered states to selectively allow access to the patient, as well as ingress and egress from the support apparatus 340. At least one of the siderails 346 includes a user interface 348 for receiving inputs from the caregiver. In various aspects, the caregiver can control the surface assembly 220 via inputs through the user interface 348 on the siderail 346.

Referring again to FIG. 35, as well as FIG. 36, the controller 320 of the pneumatic system 222 is communicatively coupled with various devices and systems via wired and/or wireless communication. In various examples, the controller 320 is communicatively coupled with a control unit 350 of the support apparatus 340. Accordingly, inputs received through the user interface 348 may be communicated to the control unit 350 and then to the controller 320 of the pneumatic system 222. The controller 320 of the pneumatic system 222 may also be configured to be communicatively coupled, either directly or indirectly, with other facility devices, such as computers or status boards at a nurse call station.

Further, the controller 320 may be configured to be communicatively coupled, either directly or indirectly, with remote devices 352, such as phones, tablets, laptops, wearable devices, or other mobile communication devices via a communication network 354. The communication network 354 may be part of a network of the medical facility. The network may include a combination of wired connections and wireless connections, which may include the wireless communication network 354. The communication network 354 includes a variety of electronic devices, which may include a combination of various wired or wireless communication protocols. The communication network 354 may be implemented via one or more direct or indirect nonhierarchical communication protocols, including but not limited to, Bluetooth®, Bluetooth® low energy (BLE), Thread, Ultra-Wideband, Z-wave, ZigBee, etc.

Additionally, the communication network 354 may correspond to a centralized hierarchal communication network 354 where one or more of the devices communicate via a router (e.g., a communication routing controller). The communication network 354 may be implemented by a variety of communication protocols including, but not limited to, global system for mobile communication (GSM), general packet radio services, code division multiple access, enhanced data GSM environment, fourth generation (4G) wireless, fifth generation (5G) wireless, Wi-Fi, world interoperability for wired microwave access (WiMAX), local area network, Ethernet, etc. By flexibly implementing the communication network 354, various devices and servers may communicate with one another directly via the wireless communication network 354 or a cellular data connection.

Communication with the pneumatic system 222 is advantageous for monitoring the operation and efficacy of the ALP therapy. Additionally, the communication allows the caregiver to monitor the function and the accuracy of the pneumatic system 222. The controller 320 and the control unit 350 disclosed herein may include various types of control circuitry, digital or analog, and may each include a processor, a microcontroller, an application specific circuit (ASIC), or other circuitry configured to perform the various input or output, control, analysis, or other functions described herein. The memory described herein may be implemented in a variety of volatile and nonvolatile memory formats. The routines include operating instructions to enable various methods and functions described herein.

Use of the present device may provide for a variety of advantages. For example, the manifold assembly 10 may be used to provide ALP therapy where one set of bladders 20, 24 is expanded with the second set of bladders 20, 24 is compressed via a vacuum. The simultaneous use of the expanded and compressed conditions increases the height difference between the first and second bladders 20, 24, providing an increase in pressure relief through the ALP therapy. Further, the manifold assembly 10 is configured to have the rotating connector 26, which changes the fluid communication of the manifold assembly 10 with the pump 194 and with the external environment. Moreover, the manifold assembly 10 has the release state with the release notches 32, 34, 170, 172 to exhaust the inflated bladders 20, 24 to a deflated neutral condition or equilibrium and inflate the compressed bladders 20, 24 to an inflated neutral condition or equilibrium. Further, the conical spring 62 is configured to reduce overall height and provide a more compact manifold assembly 10 and pneumatic system 222. Also, the manifold assembly 10 uses grease as the sealant 144, which reduces the number of components used in the manifold assembly 10. Additional benefits and advantages may be realized and/or achieved.

The device disclosed herein is further summarized in the following paragraphs and is further characterized by combinations of any and all of the various aspects described therein.

According to one aspect of the present disclosure, a manifold assembly includes a manifold core defining an inlet tube that defines a portion of a positive pressure path, an outlet tube that defines a portion of a negative pressure path, a first projection configured to be fluidly coupled with a first bladder, and a second projection configured to be fluidly coupled with a second bladder. A connector is operably coupled to the manifold core. The connector defines a first pathway region, a second pathway region, and first and second release notches. A motor is operably coupled to the connector to rotate the connector relative to the manifold core. The motor is configured to rotate the connector to a first position to fluidly couple the outlet tube with the first projection via the first pathway region and the inlet tube with the second projection via the second pathway region, rotate the connector to a second position to fluidly couple the first projection with the first release notch and the second projection with the second release notch, and rotate the connector to a third position to fluidly couple the outlet tube with the second projection via the first pathway region and the inlet tube with the first projection via the second pathway region.

According to another aspect of the present disclosure, a motor is configured to rotate to a connector 45° in a first direction from a first position to a second position.

According to another aspect of the present disclosure, a motor is configured to rotate to a connector 45° in a first direction from a second position to a third position.

According to another aspect of the present disclosure, a manifold core has an engagement surface configured to abut a connector. The engagement surface defines apertures in fluid communication with an inlet tube, an outlet tube, a first projection, and a second projection, respectively.

According to another aspect of the present disclosure, a first pathway region, a second pathway region, and first and second release notches are rotated relative to apertures as a connector is rotated.

According to another aspect of the present disclosure, an outlet tube, a first projection, and a second projection extend from a manifold core in a first direction and an inlet tube extends in a second direction from the manifold core.

According to another aspect of the present disclosure, an optical switch is configured to sense a position of a connector.

According to another aspect of the present disclosure, a positive pressure path is partially defined by first bladders, and a negative pressure path is partially defined by second bladders in a first operating state. The positive pressure path is partially defined by the first bladders and the negative pressure path is partially defined by the second bladders in a second operating state.

According to another aspect of the present disclosure, a driveshaft extends from a motor, through a manifold core, and through a connector. A retaining pin is disposed within a groove defined by the connector. The retaining pin extends through the driveshaft to couple the driveshaft to the connector.

According to another aspect of the present disclosure, a motor is disposed within a housing. A spring is coupled to the housing and a manifold core to bias the manifold core toward a connector.

According to another aspect of the present disclosure, a spring defines a conical shape.

According to another aspect of the present disclosure, a spring extends at least partially through a manifold core.

According to another aspect of the present disclosure, a surface assembly includes a covering defining an interior. First bladders are disposed within the interior. Second bladders disposed within the interior. Each of the first and second bladders is operable between an expanded condition, a neutral condition, and a compressed condition. A pump has an inlet port and an outlet port. The pump is configured to provide positive pressure through the outlet port and negative pressure through the inlet port. A manifold assembly is in fluid communication with the pump and each of the first and second bladders. The manifold assembly includes a manifold core having an inlet tube in fluid communication with the outlet port and an outlet tube in fluid communication with the inlet port. The manifold core has a first projection in fluid communication with the first bladders and a second projection in fluid communication with the second bladders. A connector is operably coupled to the manifold core. The connector defines first and second pathway regions and release notches. A motor is operably coupled to the connector. The motor is configured to rotate the connector relative to the manifold core to fluidly couple the first bladders to the inlet port and the second bladders to the outlet port in a first operating state and the first bladders to the outlet port and the second bladders to the inlet port in a second operating state.

According to another aspect of the present disclosure, a manifold core has an engagement surface that defines apertures in fluid communication with a first projection, a second projection, an inlet tube, and an outlet tube, respectively. Fluid flows through the apertures from an outlet port and to an inlet port based on a position of a connector.

According to another aspect of the present disclosure, apertures are disposed 45° from one another.

According to another aspect of the present disclosure, release notches are configured to align with apertures that are in fluid communication with first and second projections, respectively, in a release state to fluidly couple the first and second projections with an external area to adjust the first and second bladders to a neutral condition.

According to another aspect of the present disclosure, a pump is configured to direct fluid into first bladders to adjust the first bladders to an expanded condition and vacuum fluid from second bladders to adjust the second bladders to a compressed condition in a first operating state.

According to another aspect of the present disclosure, a pump is configured to direct fluid into second bladders to adjust the second bladders to an expanded condition and vacuum fluid from first bladders to adjust the first bladders to a compressed condition in a second operating state.

According to another aspect of the present disclosure, a support base extends within an interior of a covering. Retaining bands are coupled to the support base. First and second bladders are disposed within the retaining bands, respectively.

According to another aspect of the present disclosure, first and second bladders are each disposed within multiple retaining bands.

According to another aspect of the present disclosure, a pneumatic system includes first bladders and second bladders arranged in an alternating pattern. A pump is configured to provide positive pressure and negative pressure. A manifold assembly is fluidly coupled to the first and second bladders and the pump. The manifold assembly includes a manifold core having an engagement surface defining apertures in fluid communication with an inlet tube, an outlet tube, a first projection, and a second projection, respectively. A connector defines a first pathway region, a second pathway region, and release notches. A motor is configured to rotate the connector relative to the manifold core. A controller is communicatively coupled with the pump and the motor. The controller is configured to activate the motor to rotate the connector to fluidly couple the inlet tube with the first projection and the outlet tube with the second projection in at least one operating state and activate the motor to rotate the connector to align the release notches with the apertures in fluid communication with the first and second projections in a release state.

According to another aspect of the present disclosure, each bladder includes an outer membrane defining an enclosure, a core disposed within the enclosure, and a bladder connector coupled to the outer membrane and in fluid communication with an enclosure.

According to another aspect of the present disclosure, each bladder is operable between a compressed condition, a neutral condition, and an expanded condition. A shape of a core defines a shape of bladders in a neutral condition and a compressed condition.

According to another aspect of the present disclosure, an outer membrane is at least partially spaced from a core when bladders are in an expanded condition.

According to another aspect of the present disclosure, at least one operating state includes a first operating state and a second operating state. An inlet tube is fluidly coupled with a second projection and an outlet tube is fluidly coupled with a first projection in a first operating state.

According to another aspect of the present disclosure, an inlet tube is fluidly coupled with a first projection, and an outlet tube is fluidly coupled with a second projection in a second operating state.

According to another aspect of the present disclosure, a position of first and second pathway regions of a connector determines whether a pneumatic system is in a first operating state or a second operating state.

According to another aspect of the present disclosure, sensors are in fluid communication with first and second bladders. The sensors are configured to sense pressure within the first and second bladders, respectively.

According to another aspect of the present disclosure, a manifold assembly includes a housing and a motor is disposed within the housing. A driveshaft extends from the motor and through the housing to engage a connector.

According to another aspect of the present disclosure, a housing includes supports defining a space for receiving a manifold core.

A means for directing airflow includes a core means having an inlet tube that defines a portion of a positive pressure path, an outlet tube that defines a portion of a negative pressure path, a first projection configured to be fluidly coupled to a first bladder means, and a second projection configured to be fluidly coupled to a second bladder means. A directing means is operably coupled to the core means. The directing means defines a first means for guiding the airflow, a second means for guiding the airflow, and first and second release means. A drive means is operably coupled to the directing means through the core means to rotate the directing means relative to the core means. The drive means is configured to rotate the directing means to a first position to fluidly couple the outlet tube with the first projection via the first means for guiding the airflow and the inlet tube with the second projection via the second means for guiding the airflow, rotate the directing means to a second position to fluidly couple the first projection with the first release means and the second projection with the second release means, and rotate the directing means to a third position to fluidly couple the outlet tube with the second projection via the first means for guiding the airflow and the inlet tube with the first projection via the second means for guiding the airflow.

Related applications, for example those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating states, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A manifold assembly, comprising:

a manifold core defining an inlet tube that defines a portion of a positive pressure path, an outlet tube that defines a portion of a negative pressure path, a first projection configured to be fluidly coupled with a first bladder, and a second projection configured to be fluidly coupled with a second bladder;

a connector operably coupled to the manifold core, wherein the connector defines a first pathway region, a second pathway region, and first, second, third, and fourth release notches; and a motor operably coupled to the connector to rotate the connector relative to the manifold core, wherein the motor is configured to:

rotate the connector in a first direction to a first position to fluidly couple the outlet tube with the first projection via the first pathway region and the inlet tube with the second projection via the second pathway region;

rotate the connector in the first direction to a second position to fluidly couple the first projection with the first release notch and the second projection with the second release notch;

rotate the connector in the first direction to a third position to fluidly couple the outlet tube with the second projection via the first pathway region and the inlet tube with the first projection via the second pathway region; and rotate the connector in the first direction to a fourth position to fluidly couple the first projection with the third release notch and the second projection with the fourth release notch.

2. The manifold assembly of claim 1, wherein the motor is configured to rotate the connector 45° in the first direction from the first position to the second position, and wherein the motor is configured to rotate the connector 45° in the first direction from the second position to the third position.

3. The manifold assembly of claim 1, wherein the manifold core has an engagement surface configured to abut the connector, and wherein the engagement surface defines apertures in fluid communication with the inlet tube, the outlet tube, the first projection, and the second projection, respectively, and wherein the first pathway region, the second pathway region, and the first and second release notches are rotated relative to the apertures as the connector is rotated.

4. The manifold assembly of claim 1, wherein the outlet tube, the first projection, and the second projection extend from the manifold core in a first direction and the inlet tube extends in a second direction from the manifold core.

5. The manifold assembly of claim 1, wherein the positive pressure path is partially defined by the first bladder and the negative pressure path is partially defined by the second bladder in a first operating state, and wherein the positive pressure path is partially defined by the first bladder and the negative pressure path is partially defined by the second bladder in a second operating state.

6. The manifold assembly of claim 1, further comprising:

a driveshaft extending from the motor, through the manifold core, and through the connector; and a retaining pin disposed within a groove defined by the connector, wherein the retaining pin extends through the driveshaft to couple the driveshaft to the connector.

7. The manifold assembly of claim 1, further comprising:

a housing, wherein the motor is disposed within the housing; and a spring coupled to the housing and the manifold core to bias the manifold core toward the connector.

8. The manifold assembly of claim 7, wherein the spring defines a conical shape with a width increasing as the spring extends away from the housing.

9. A surface assembly comprising:

a covering defining an interior;

first bladders disposed within the interior;

second bladders disposed within the interior, and wherein each of the first and second bladders are operable between an expanded condition, a neutral condition, and a compressed condition;

a pump having an inlet port and an outlet port, wherein the pump is configured to provide positive pressure through the outlet port and negative pressure through the inlet port; and a manifold assembly in fluid communication with the pump and each of the first and second bladders, the manifold assembly including:
a manifold core having an inlet tube in fluid communication with the outlet port and an outlet tube in fluid communication with the inlet port, and wherein the manifold core has a first projection in fluid communication with the first bladders and a second projection in fluid communication with the second bladders;
a connector operably coupled to the manifold core, wherein the connector defines first and second pathway regions and release notches; and
a motor operably coupled to the connector, wherein the motor is configured to rotate the connector relative to the manifold core to fluidly couple the first bladders to the inlet port and the second bladders to the outlet port in a first operating state to expand the first bladders and vacuum the second bladders and the first bladders to the outlet port and the second bladders to the inlet port in a second operating state to vacuum the first bladders and expand the second bladders, and wherein the motor is configured to rotate the connector relative to the manifold core to fluidly couple the first and second bladders with the release notches in a release state where the first and second bladders are free of communication with the pump to adjust to the neutral condition.

10. The surface assembly of claim 9, wherein the manifold core has an engagement surface that defines apertures in fluid communication with the first projection, the second projection, the inlet tube, and the outlet tube, respectively, and wherein fluid flows through the apertures from the outlet port and to the inlet port based on a position of the connector.

11. The surface assembly of claim 10, wherein the apertures are disposed 45° from one another.

12. The surface assembly of claim 9, wherein the release notches are configured to align with apertures that are in fluid communication with the first and second projections, respectively, in the release state to fluidly couple the first and second projections with an external area to adjust the first and second bladders to the neutral condition defined by cores disposed in the first and second bladders, respectively.

13. The surface assembly of claim 9, wherein the pump is configured to direct fluid into the second bladders to adjust the second bladders to the expanded condition and vacuum fluid from the first bladders to adjust the first bladders to the compressed condition in the first operating state.

14. The surface assembly of claim 13, wherein the pump is configured to direct the fluid into the first bladders to adjust the first bladders to the expanded condition and vacuum the fluid from the second bladders to adjust the second bladders to the compressed condition in the second operating state.

15. The surface assembly of claim 9, further comprising:
a support base extending within the interior of the covering; and
retaining bands coupled to the support base, wherein the first and second bladders are disposed within the retaining bands, respectively.

16. A pneumatic system, comprising:
first bladders;
second bladders arranged in an alternating pattern with the first bladders;
a pump configured to provide positive pressure and negative pressure;
a manifold assembly fluidly coupled to the first and second bladders and the pump, wherein the manifold assembly includes:
a manifold core having an engagement surface defining apertures in fluid communication with an inlet tube, an outlet tube, a first projection, and a second projection, respectively;
a connector defining a first pathway region, a second pathway region, and release notches; and
a motor configured to rotate the connector relative to the manifold core; and
a controller communicatively coupled with the pump and the motor, wherein the controller is configured to:
activate the motor to rotate the connector to fluidly couple the inlet tube with the first projection and the outlet tube with the second projection in pressurized operating states; and
activate the motor to rotate to the connector to align the release notches with the apertures in fluid communication with the first and second projections in release states, wherein rotational positions of the connector alternate between the pressurized operating states and the release states to adjust the first and second bladders between a first pressurized condition and a second pressurized condition via a neutral condition.

17. The pneumatic system of claim 16, wherein the pressurized operating states include a first operating state and a second operating state, and wherein the inlet tube is fluidly coupled with the second projection and the outlet tube is fluidly coupled with the first projection in the first operating state, and further wherein the inlet tube is fluidly coupled with the first projection and the outlet tube is fluidly coupled with the second projection in the second operating state.

18. The pneumatic system of claim 17, wherein a position of the first and second pathway regions of the connector determines whether said pneumatic system is in the first operating state or the second operating state.

19. The pneumatic system of claim 16, further comprising:
sensors in fluid communication with the first and second bladders, wherein the sensors are configured to sense pressure within the first and second bladders, respectively.

20. The pneumatic system of claim 16, wherein the manifold assembly includes a housing and the motor is disposed within the housing, and wherein a driveshaft extends from the motor and through the housing to engage the connector.

* * * * *